(12) United States Patent
Iizuka et al.

(10) Patent No.: US 10,873,515 B2
(45) Date of Patent: Dec. 22, 2020

(54) RECORDING MEDIUM RECORDING PACKET ANALYSIS PROGRAM, PACKET ANALYSIS METHOD, AND INFORMATION PROCESSING DEVICE

(71) Applicant: FUJITSU LIMITED, Kawasaki (JP)

(72) Inventors: Fumiyuki Iizuka, Kawasaki (JP); Yuji Nomura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/504,382

(22) Filed: Jul. 8, 2019

(65) Prior Publication Data
US 2019/0334799 A1 Oct. 31, 2019

Related U.S. Application Data

(63) Continuation of application No. PCT/JP2017/046500, filed on Dec. 25, 2017.

(30) Foreign Application Priority Data

Jan. 10, 2017 (JP) .................................. 2017-002066

(51) Int. Cl.
H04L 12/26 (2006.01)
(52) U.S. Cl.
CPC .......... H04L 43/0817 (2013.01); H04L 43/04 (2013.01); H04L 43/08 (2013.01);
(Continued)
(58) Field of Classification Search
CPC ..... H04L 43/04; H04L 43/0823; H04L 43/16; H04L 43/18
(Continued)

(56) References Cited

U.S. PATENT DOCUMENTS

2015/0172225 A1* 6/2015 Iizuka ..................... H04L 41/14
370/216

FOREIGN PATENT DOCUMENTS

JP 2013-030826 2/2013
JP 2013-201695 10/2013
(Continued)

OTHER PUBLICATIONS

International Search Report, mailed in connection with PCT/JP2017/046500 and dated Mar. 20, 2018 (1 page).

*Primary Examiner* — Glenford J Madamba
(74) *Attorney, Agent, or Firm* — Fujitsu Patent Center

(57) ABSTRACT

A recording medium recording a program for causing a computer to execute processing includes: accumulating a packet in a first memory; accumulating, in a second memory, first information regarding communication performance of a connection which is used to transfer the packet in association with second information indicating the connection based on the packet; registering, for each of connections, the second information in a third memory at time intervals with reference to the second memory in association with one of index value ranges including an index value indicating the communication performance of the respective connections; extracting, with reference to the third memory, a packet which is transferred through a connection corresponding to a specific index value range out of packets that are accumulated in the first memory and for which a first time is elapsed from acquisition of the packets; and storing the extracted packet in a fourth memory.

10 Claims, 28 Drawing Sheets

(52) U.S. Cl.
CPC .......... *H04L 43/0823* (2013.01); *H04L 43/16* (2013.01); *H04L 43/18* (2013.01)

(58) Field of Classification Search
USPC ........................................................ 709/224
See application file for complete search history.

(56) References Cited

FOREIGN PATENT DOCUMENTS

| | | |
|---|---|---|
| JP | 2015-076780 | 4/2015 |
| JP | 2015-115842 | 6/2015 |

\* cited by examiner

FIG. 4

| CONNECTION ID | TRANSMISSION SOURCE IP | TRANSMISSION DESTINATION IP | PROTOCOL NO. | TRANSMISSION SOURCE PORT | TRANSMISSION DESTINATION PORT | ABNORMAL CONNECTION INFORMATION POINTER |
|---|---|---|---|---|---|---|
| con1 | 10.20.30.40 | 10.20.30.50 | 6 | 2000 | 20 | *con 1 ABNORMAL INFORMATION ADDRESS |
| con2 | 20.30.40.50 | 10.20.30.60 | 6 | 3000 | 80 | - |
| con3 | 30.40.50.60 | 40.50.60.70 | 17 | 4000 | 3000 | *con 3 ABNORMAL INFORMATION ADDRESS |
| ... | ... | ... | ... | ... | ... | - |

| WRITE POINTER | READ POINTER | |
|---|---|---|
| 7 | 5 | |
| PACKET ID | CONNECTION ID | RECEPTION DATE AND TIME |
| PC-000001 | con1 | 4/1 10:00:00.100000 |
| PC-000002 | con2 | 4/1 10:00:00.200000 |
| PC-000003 | con2 | 4/1 10:00:00.300000 |
| PC-000004 | con3 | 4/1 10:00:00.400000 |
| PC-000005 | con3 | 4/1 10:00:00.500000 |
| PC-000006 | con1 | 4/1 10:00:00.600000 |
| | | |
| | | |

| CONNECTION ID | NUMBER OF PACKETS ON TRANSMISSION SIDE | NUMBER OF BYTES ON TRANSMISSION SIDE | NUMBER OF LOSSES ON TRANSMISSION SIDE | NUMBER OF PACKETS ON RECEPTION SIDE | NUMBER OF BYTES ON RECEPTION SIDE | NUMBER OF LOSSES ON RECEPTION SIDE | RTT AVERAGE VALUE | SERVER DELAY AVERAGE VALUE |
|---|---|---|---|---|---|---|---|---|
| con1 | 125 | 12504 | 10 | ⋮ | ⋮ | ⋮ | ⋮ | ⋮ |
| con2 | 2468 | 200000 | ⋮ | ⋮ | ⋮ | ⋮ | ⋮ | ⋮ |
| con3 | 250 | 10000 | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ |

| QUANTITY | NEXT WRITING POSITION |
|---|---|
| 8 | 1 |
| TIME | ABNORMALITY LEVEL |
| 10:00:10 | 60 |
| 10:00:15 | 60 |
| 10:00:20 | 60 |
| 10:00:25 | 55 |
| 10:00:30 | 55 |
| 10:00:35 | 55 |
| 10:00:40 | 55 |
| 10:00:45 | 50 |

RECORDING MEDIUM RECORDING PACKET ANALYSIS PROGRAM, PACKET ANALYSIS METHOD, AND INFORMATION PROCESSING DEVICE

CROSS-REFERENCE TO RELATED APPLICATION

This application is a continuation application of International Application PCT/JP2017/046500 filed on Dec. 25, 2017 and designated the U.S., the entire contents of which are incorporated herein by reference. The International Application PCT/JP2017/046500 is based upon and claims the benefit of priority of the prior Japanese Patent Application No. 2017-002066, filed on Jan. 10, 2017, the entire contents of which are incorporated herein by reference.

FIELD

The embodiment discussed herein is related to a packet analysis program, a packet analysis method, and an information processing device.

BACKGROUND

Packets transferred between devices are obtained using a mirroring function of a switch or a router and the packets are temporarily accumulated, and a packet transferred through a connection determined to be abnormal out of the accumulated packets is extracted and preserved, and thereafter the extracted packet is analyzed.

Japanese Laid-Open Patent Publication No. 2013-201695 and Japanese Laid-Open Patent Publication No. 2013-30826 are disclosed as related art.

SUMMARY

According to an aspect of the embodiments, a non-transitory computer-readable recording medium having stored therein a packet analysis program for causing a computer to execute processing includes: accumulating a packet in a first memory; accumulating, in a second memory, first information regarding communication performance of a connection which is used to transfer the packet in association with second information indicating the connection based on the packet; registering, for each of connections, the second information in a third memory at time intervals with reference to the second memory in association with one of a plurality of index value ranges including an index value indicating the communication performance of the respective connections; extracting, with reference to the third memory, a packet which is transferred through a connection corresponding to a specific index value range out of packets that are accumulated in the first memory and for which a first time is elapsed from acquisition of the packets; and storing the extracted packet in a fourth memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of content stored in a connection table 400;

FIG. 5 is a diagram illustrating an example of content stored in an index table 500;

FIG. 8 is a diagram illustrating an example of content stored in an abnormality level history 800;

DESCRIPTION OF EMBODIMENTS

For example, in a case where there is a failure for which no importance degree has been registered, a failure occurrence history database is referred on the basis of variation in the failure occurrence frequency and interval and the importance degree of the failure is estimated. For example, the failure level is decided with reference to a failure level table on the basis of an influence range and the elapsed time, for example.

However, the greater the data transfer rate of the network, the greater the number of connections generated between devices. This would also increase the number of packets to be preserved, making it difficult to preserve packets. Even when the number of packets to be preserved is limited, it may be still difficult to judge a target packet to be preferentially preserved in terms of which connection has been used to transfer the packet.

For example, a packet analysis program, a packet analysis method, and a packet analysis device capable of selectively storing a packet in accordance with communication performance of the connection may be provided.

Hereinafter, embodiments of a packet analysis program, a packet analysis method, and a packet analysis device according to the present invention will be described in detail with reference to the drawings.

(Example of Packet Analysis Method According to Embodiment)

Figure 1:
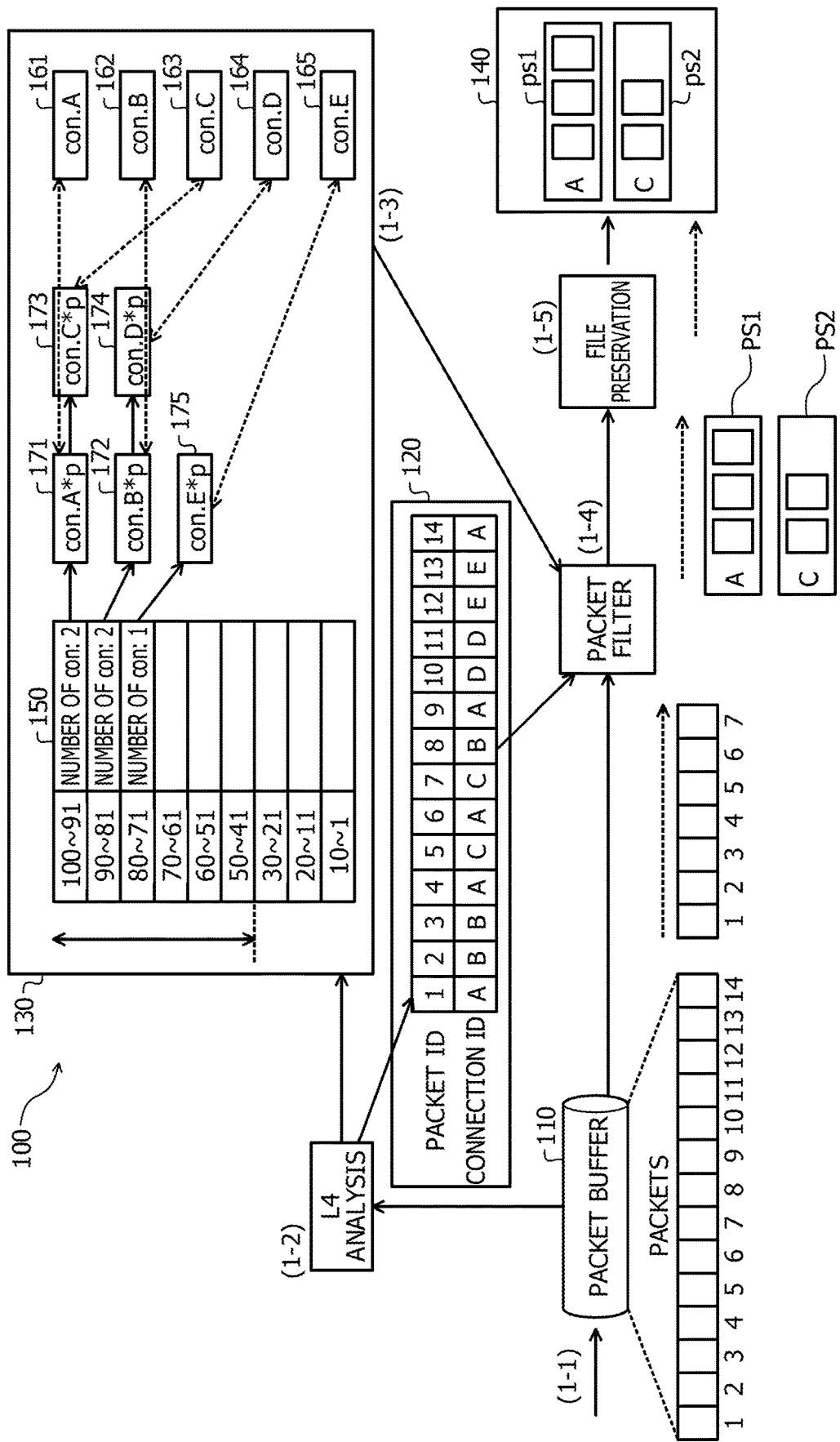
FIG. 1 is a diagram illustrating an example of a packet analysis method according to an embodiment.

FIG. 1 is a diagram illustrating an example of a packet analysis method according to an embodiment. A packet analysis device 100 is a computer that analyzes various connections between certain devices and a network that connects the devices, or the like, on the basis of packets transferred between the devices.

Here, there is a conceivable case where all packets transferred between certain devices are stored for a relatively long time, and connections between the devices are analyzed post-actively in detail. This case, however, might enormously increase the number of packets to be stored to cause shortage of storage regions used to store the packets. This might lead to a failure in analysis of various connections between certain devices or a network that connects certain devices.

In contrast, there is a conceivable case where a packet transferred through the connection determined to be abnormal is selectively extracted out of the packets transferred between certain devices, and is stored for a relatively long time, and then, connections between the devices are analyzed post-actively in detail. However, when a high-speed network of 10 to 100 giga bits per second (Gbps) is used, even this case might enormously increase the number of packets to be stored, leading to the shortage of storage regions used to store the packets. This might lead to a failure in analysis of various connections between certain devices or a network that connects certain devices.

As opposed to this, there is another conceivable case where a plurality of connections between certain devices is sorted on the basis of a predetermined standard, and judgment is made as to which inter-device connection's packet is to be preferentially extracted and stored for a relatively long period. This case, however, would increase the processing load and processing time taken for packet extraction. Moreover, the increase in the processing time would make it difficult to judge whether to extract the packet before deletion of the packet from a packet buffer. This might lead to a failure in analysis of various connections between certain devices or a network that connects certain devices.

To overcome this, the present embodiment will give a description of a packet analysis method that associates an index value indicating the connection's communication performance with any of a plurality of prepared index value ranges so as to be able to selectively store packets with a relatively low processing load.

In an example of FIG. 1, the packet analysis device 100 includes a first storage 110, a second storage 120, a third storage 130, and a fourth storage 140. The first storage 110 is a storage region that temporarily accumulates packets. An example of the first storage 110 is a packet buffer. The packets stored in the first storage 110 might be overwritten and deleted by another packet with lapse of time in some cases.

The second storage 120 is a storage region that stores connection information concerning a connection used to transfer a certain packet. The connection information includes information associating information indicating a connection used to transfer a certain packet with information regarding communication performance of the connection used to transfer the packet. The connection information includes information, for example, associating packet ID of a certain packet, information indicating a connection used to transfer the certain packet, and information regarding communication performance of the connection used to transfer the packet with each other.

The information indicating the connection is a connection ID assigned to the connection, for example. Examples of the information regarding the communication performance of the connection include the connection's packet loss rate, round-trip time (RTT), server delay, or the like. The information regarding the communication performance of the connection may be an abnormality level of the connection obtained from the connection's packet loss rate, RU, server delay, or the like. The server delay is, for example, time taken from a point when the server receives a request through processing in response to the request up to the point of returning a response.

The third storage 130 is a storage region in which information indicating several connections is registered in association with each of index value ranges of a plurality of prepared index value ranges. An example of the index value is the abnormality level of the connection calculated on the basis of the connection's packet loss rate, RU, server delay, or the like. The index value may be the connection's the packet loss rate, RU, server delay, or the like. The index value range is an abnormality level range, for example. The third storage 130 can store information used when the packet analysis device 100 decides which packet to extract from the first storage 110.

The fourth storage 140 is a storage region that can store packets for a longer period than the first storage 110. The fourth storage is, for example, a preservation file prepared on a nonvolatile memory. The fourth storage 140 can store packets used for analysis of various connections between certain devices, a network that connects certain devices, or the like, by the packet analysis device 100.

(1-1) The packet analysis device 100 obtains packets transferred between certain devices using the mirroring function, and accumulates the obtained packets in the first storage 110. The packet analysis device 100 sequentially obtains packets 1 to 14 transferred between certain devices, for example, and accumulates the obtained packets in a packet buffer. With this configuration, the packet analysis device 100 can temporarily store a packet that can be used for analysis of a connection between certain devices, a network that connects certain devices, or the like.

(1-2) On the basis of the obtained packet, the packet analysis device 100 accumulates information regarding the communication performance of the connection used to transfer the packet in the second storage 120 in association with the information indicating the connection used to transfer the packet. For example, every time a packet is obtained, the packet analysis device 100 performs L4 analysis on the basis of the obtained packet, and then, accumulates connection information regarding the connection used to transfer the packet, in the second storage 120.

For example, when packet 1 is obtained, the packet analysis device 100 stores connection information for connection A used to transfer packet 1. With this configuration, the packet analysis device 100 can store connection information used at decision as to which index value range is used for associating a connection between certain devices.

(1-3) The packet analysis device 100 performs, for each of connections at predetermined time intervals, registration of information indicating the connection in the third storage 130 in association with any of a plurality of index value ranges including an index value indicating communication performance of the connection. The packet analysis device 100 uses a list structure, for example, and registers abnormal connection information. The abnormal connection information includes information indicating a connection used to transfer the packet having a possibility to be extracted from the first storage 110. The abnormal connection information includes a connection ID, for example, as information indicating a connection.

For example, the packet analysis device 100 prepares an abnormality level range list 150 indicating a plurality of abnormality level ranges. The packet analysis device 100 stores abnormal connection information 161 to 165 in association with the individual abnormality level ranges indicated by the abnormality level range list 150 using pointers 171 to 175. This enables the packet analysis device 100 to register, with a relatively low processing load, connection information used at selection of a packet to be extracted from the packet buffer.

(1-4) The packet analysis device 100 performs, at predetermined time intervals, extraction of a packet transferred through the connection corresponding to a specific index value range out of the packets accumulated in the first storage 110 and for which a predetermined time has elapsed since acquisition, with reference to the third storage 130. The specific index value range is an index value range in which the number of pieces of associated abnormal connection information is a predetermined number or less, for example. The specific index value range may be a range from a preset upper limit value to a lower limit value, for example.

The packet analysis device 100 extracts packets ps1 and ps2 transferred through connections A and C corresponding to a specific abnormality level range "91 to 100" among the packets 1 to 7 accumulated in the packet buffer and for which a predetermined time has elapsed since acquisition. Alternatively, the packet analysis device 100 may extract packets transferred through the connections A to D corresponding to the abnormality level range "81 to 100" in which the number of pieces of associated abnormal connection information is limited to four or less, for example. This enables the packet analysis device 100 to extract the packet before deletion of the packet from the packet buffer. Moreover, the packet analysis device 100 can limit the number of packets stored in the fourth storage 140.

(1-5) The packet analysis device 100 stores the extracted packet in the fourth storage 140. The packet analysis device 100 stores the packets ps1 and ps2 in the fourth storage 140, for example. With this configuration, the packet analysis device 100 can analyze, post-actively in detail, various connections between certain devices, a network that connects certain devices, or the like, on the basis of the packets stored in the fourth storage 140. The packet analysis device 100 does not have to perform sorting based on the index value, and can extract a packet from the packet buffer with a relatively low processing load and store the packet in the fourth storage 140.

In addition, the packet analysis device 100 can limit the number of packets stored in the fourth storage 140, making it possible to suppress shortage of the storage region of the fourth storage 140 used to store the packets. Accordingly, the packet analysis device 100 can suppress an occurrence of an error in the processing of the own device due to the shortage of the storage region. In addition, the packet analysis device 100 sets a specific index value range, making it possible to preferentially extract a packet having relatively high possibility to be used at the time of post-active and detailed analysis of a connection etc., and can store the extracted packet in the fourth storage 140. This enables the packet analysis device 100 to preferentially save a packet judged to be preferably saved in the fourth storage 140 before deletion of the packet from the packet buffer.

Moreover, as described below with reference to FIGS. 12 to 15, the packet analysis device 100 may control how or when the registration state of the abnormal connection information in the third storage 130 is to be updated in accordance with various rules. With this control, the packet analysis device 100 can more effectively extract a packet having relatively high possibility to be used at the time of post-active and detailed analysis of a connection or the like.

The packet analysis device 100 may prepare two types of abnormality level range list 150, one for operation and one for update. With this configuration, the packet analysis device 100 updates the abnormality level range list 150, and thus, it is possible, with reference to the abnormality level range list 150, to omit necessity of waiting for execution of processing of extracting a packet transferred through any of connections.

(Example of Packet Analysis System 200)

Next, an example of a packet analysis system 200 to which the packet analysis device 100 illustrated in FIG. 1 is applied will be described with reference to FIG. 2.

Figure 2:
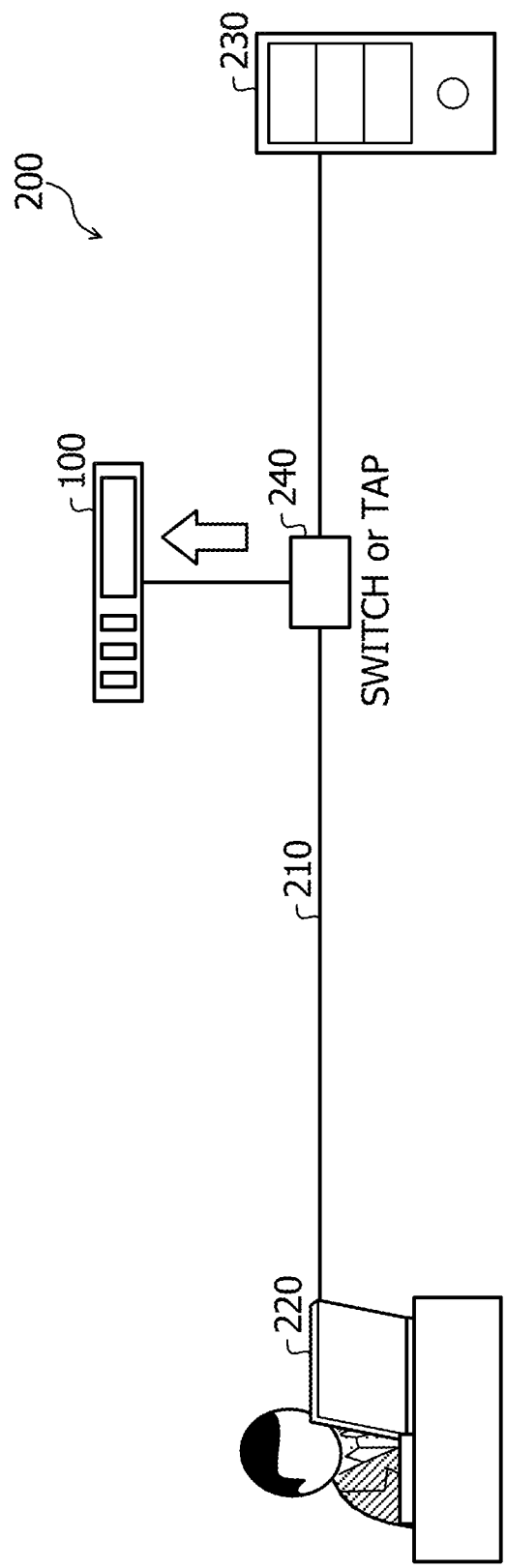
FIG. 2 is a diagram illustrating an example of a packet analysis system 200.

FIG. 2 is a diagram illustrating an example of a packet analysis system 200. In FIG. 2, the packet analysis system 200 includes a packet analysis device 100, a client device 220, and a server device 230. The packet analysis system 200 may include a plurality of the client devices 220 or may include a plurality of the server devices 230.

In the packet analysis system 200, the client device 220 and the server device 230 are connected via a wired or wireless network 210. Examples of the network 210 include a local area network (LAN), a wide area network (WAN), and the Internet.

The packet analysis device 100 obtains and accumulates packets transferred between the client device 220 and the server device 230 via a relay device 240 such as a switch or a TAP provided in the network. Examples of the packet analysis device 100 include a server and a personal computer (PC).

The client device 220 is a computer that generates a connection with the server device 230 and communicates with the server device 230. Examples of the client device 220 include a PC, a laptop PC, a tablet terminal, or a smartphone. The server device 230 is a computer that generates a connection with the client device 220 and communicates with the client device 220. Examples of the server device 230 include a server or a PC.

(Hardware Configuration Example of the Packet Analysis Device 100)

Next, a hardware configuration example of the packet analysis device 100 will be described with reference to FIG. 3.

Figure 3:
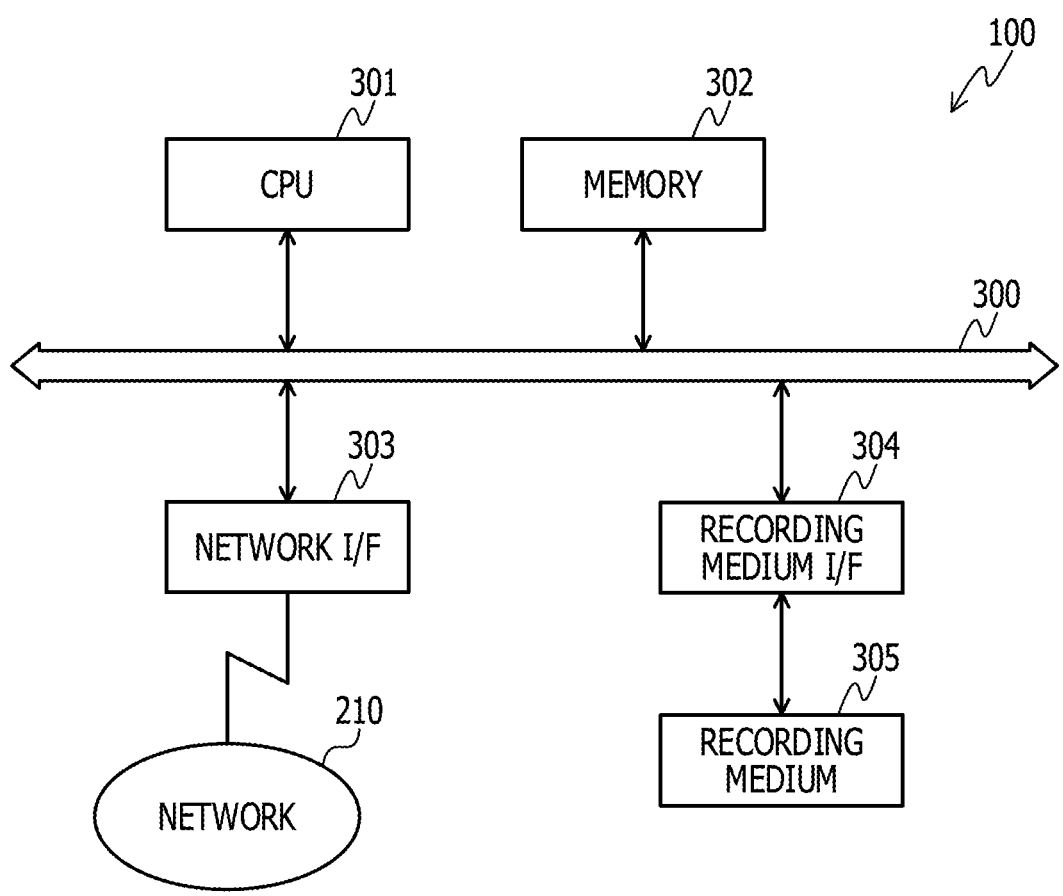
FIG. 3 is a block diagram indicating a hardware configuration example of a packet analysis device 100.

FIG. 3 is a block diagram indicating a hardware configuration example of the packet analysis device 100. In FIG. 3, the packet analysis device 100 includes a central processing unit (CPU) 301, a memory 302, a network interface (I/F) 303, a recording medium I/F 304, and a recording medium 305. Each of components is interconnected by a bus 300.

Here, the CPU 301 performs overall control of the packet analysis device 100. The memory 302 includes a read only memory (ROM), a random access memory (RAM), and a flash ROM, for example. For example, for example, a flash ROM or a ROM stores various programs, while a RAM is used as a work area for the CPU 301. The program stored in the memory 302 is loaded into the CPU 301 to cause the CPU 301 to execute coded processing.

The network I/F 303 is connected to the network 210 through the relay device 240. The network I/F 303 controls the interface between the relay device 240 and the inside, and controls input-output of data from the relay device 240. For example, a modem or a LAN adapter can be employed as the network I/F 303.

The recording medium I/F 304 controls read and write of data toward the recording medium 305 under the control of the CPU 301. The recording medium I/F 304 is, for example, a magnetic disk drive or an optical disk drive. The recording medium I/F 304 may be, for example, a universal serial bus (USB) port. The recording medium 305 is a nonvolatile memory that stores data written under the control of the recording medium I/F 304. Examples of the recording medium 305 include a magnetic disk or an optical disk. The recording medium 305 may be, for example, a USB memory. The recording medium 305 may be removably installed on the packet analysis device 100. The recording medium 305 may store the packet analysis program according to the embodiment.

The packet analysis device 100 may include a solid state drive (SSD) or a semiconductor memory, for example, in addition to the components described above. The packet analysis device 100 may further include a keyboard, a mouse, a display, or the like, for example, in addition to the components described above. The packet analysis device 100 may omit the recording medium I/F 304 or the recording medium 305.

(Content Stored in Connection Table 400)

Next, an example of content stored in a connection table 400 will be described with reference to FIG. 4. The connection table 400 is implemented by a storage region such as the memory 302 or the recording medium 305 of the packet analysis device 100 illustrated in FIG. 3, for example.

FIG. 4 is a diagram illustrating an example of content stored in the connection table 400. As illustrated in FIG. 4, the connection table 400 includes fields of Connection ID, Transmission source IP, Transmission destination IP, Protocol number, Transmission source port, Transmission destination port, and Abnormal connection information pointer. With information having been set in each of the fields, the connection table 400 stores connection information as a record.

The field of Connection ID is a setting field for the connection ID of the connection used to transfer a packet, extracted from header information of the packet obtained by the packet analysis device 100. The field of Transmission source IP is a setting field for transmission source IP address indicating a transmission source device of a packet in the connection indicated by the connection ID. The field of Transmission destination IP is a setting field for transmission destination IP address indicating a transmission destination device of a packet in the connection indicated by the connection ID.

The field of Protocol number is a setting field for the number that identifies a protocol. The field of Transmission source port is a setting field for a port number indicating a transmission source port of a packet in the connection indicated by the connection ID. The field of Transmission destination port is a setting field for a port number indicating a transmission destination port of a packet in the connection indicated by the connection ID. The field of Abnormal connection information pointer is a setting field for a pointer to abnormal connection information in a case where there is abnormal connection information for the connection indicated by the connection ID.

(Content Stored in Index Table 500)

Next, an example of content stored in an index table 500 will be described with reference to FIG. 5. The index table 500 is implemented by a storage region such as the memory 302 or the recording medium 305 of the packet analysis device 100 illustrated in FIG. 3, for example.

FIG. 5 is a diagram illustrating an example of content stored in the index table 500. As illustrated in FIG. 5, the index table 500 includes fields of Write pointer, Read pointer, Packet ID, Connection ID, and Reception date and time. With information having been set in each of the fields of Packet ID, Connection ID, and Reception date and time, the index table 500 stores index information as a record.

The field of Write pointer is a setting field for a write pointer that designates a record to be written next. The write pointer has a value of 1 or more and the maximum number of records in the index table 500, or less. Every time writing to the index table 500 is performed, the write pointer is incremented by one. The value of the write pointer is a value indicating the order of the designated record from the head.

The field of Read pointer is a setting field for a read pointer that designates a record to be read next. The read pointer has a value of 1 or more and the maximum number of records in the index table 500, or less. Every time reading from the index table 500 is performed, the read pointer is incremented by one. The value of the read pointer is a value indicating the order of the designated record from the head.

The field of Packet ID is a setting field for Packet ID of a packet obtained by the packet analysis device 100, in order to manage the packets obtained by the packet analysis device 100. The field of Connection ID is a setting field for the connection ID of the connection used to transfer a packet, extracted from header information of the packet obtained by the packet analysis device 100. The field of Reception date and time is a setting field for the date and time of acquisition of the packet by the packet analysis device 100.

(Content Stored in L4 Analysis Information Table 600)

Next, an example of content stored in an L4 analysis information table 600 will be described with reference to FIG. 6. The L4 analysis information table 600 is implemented by a storage region such as the memory 302 or the recording medium 305 of the packet analysis device 100 illustrated in FIG. 3, for example.

Figure 6:
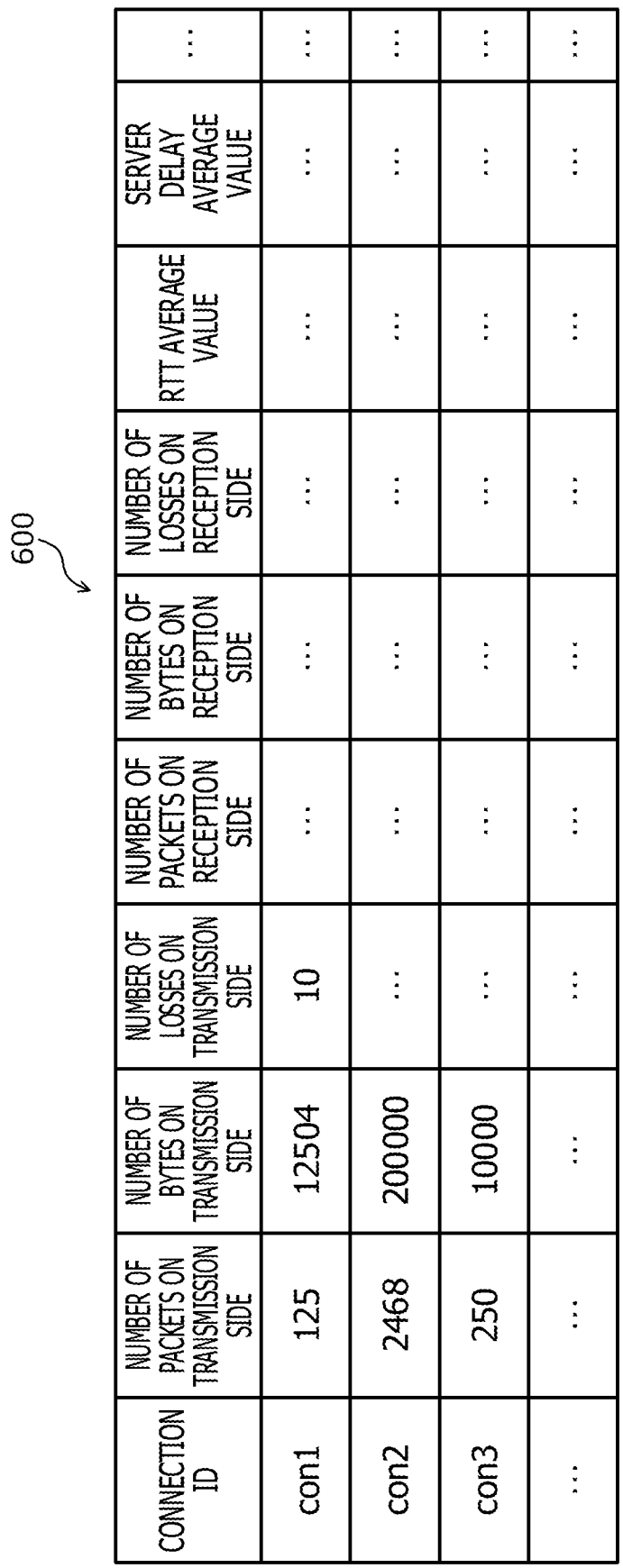
FIG. 6 is a diagram illustrating an example of content stored in an L4 analysis information table 600.

FIG. 6 is a diagram illustrating an example of content stored in the L4 analysis information table 600. As illustrated in FIG. 6, the L4 analysis information table 600 includes fields of Connection ID, Number of packets on transmission side, Number of bytes on transmission side, Number of losses on transmission side, Number of packets on reception side, Number of bytes on reception side, Number of losses on reception side, RU average value, and Server delay average value. With information having been set in each of the fields, the L4 analysis information table 600 stores L4 analysis information as a record.

The field of Connection ID is a setting field for the connection ID of the connection used to transfer a packet, extracted from header information of the packet obtained by the packet analysis device 100. The field of Number of packets on transmission side is a setting field for the number of packets transmitted from the transmission side device through the connection indicated by the connection ID. The field of Number of bytes on transmission side is a setting for the total number of bytes of packets transmitted from the transmission side device through the connection indicated by the connection ID. The field of Number of losses on transmission side is a setting field for the number of packets lost out of the packets transmitted from the transmission side device through the connection indicated by the connection ID.

The field of Number of packets on reception side is a setting field for the number of packets received on the reception side device through the connection indicated by the connection ID. The field of Number of bytes on reception side is a setting field for the total number of bytes of packets received on the reception side device through the connection indicated by the connection ID. The field of Number of losses on reception side is a setting field for the number of packets not received by the reception side device out of the packets transmitted from the transmission side device through the connection indicated by the connection ID. The field of RU average value is a setting field for an RU average value in the connection indicated by the connection ID. The field of server delay average value is a setting field for a server delay average value in the connection indicated by the connection ID. The server delay is, for example, time taken from a point when the server device 230 receives a request from the client device 220 through processing in response to the request up to the point of returning a response to the client device 220.

(Content Stored in Abnormal Connection Information Table 700)

Next, an example of content stored in an abnormal connection information table 700 will be described with reference to FIG. 7. The abnormal connection information table 700 is implemented by a storage region such as the memory 302 or the recording medium 305 of the packet analysis device 100 illustrated in FIG. 3, for example.

Figure 7:
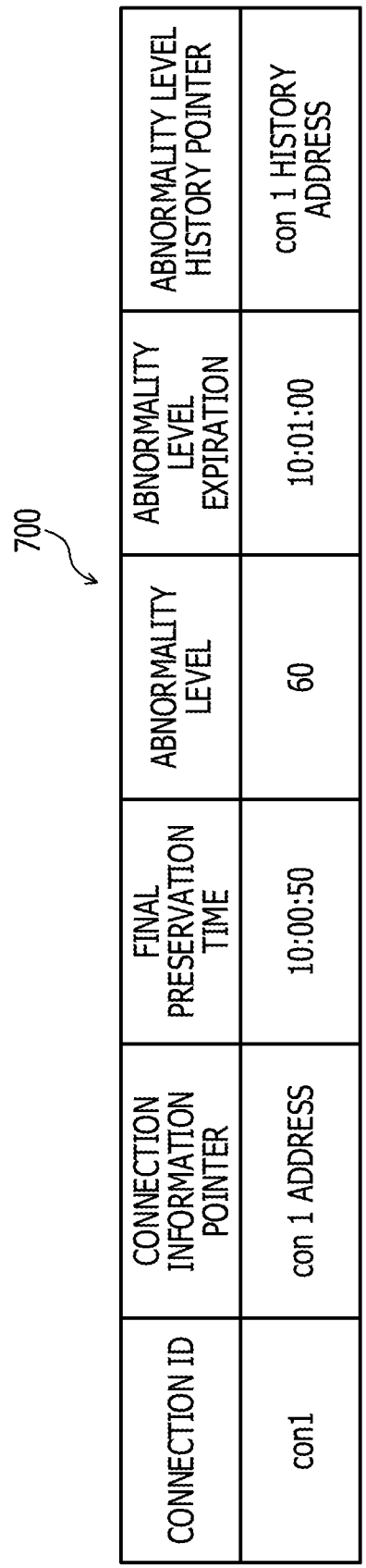
FIG. 7 is a diagram illustrating an example of content stored in an abnormal connection information table 700.

FIG. 7 is a diagram illustrating an example of content stored in the abnormal connection information table 700. As illustrated in FIG. 7, the abnormal connection information table 700 includes fields of Connection ID, Connection information pointer, Final preservation time, Abnormality level, Abnormality level expiration, and Abnormality level history pointer. With information having been set in each of the fields, the abnormal connection information table 700 stores abnormal connection information as a record.

The field of Connection ID is a setting field for a connection ID of an abnormal connection determined to be abnormal and used to transfer a packet having possibility of being extracted. The field of Connection information pointer is a setting field for a pointer to the connection information of the connection table 400, having setting of the same connection ID as that of the abnormal connection.

The field of Final preservation time is a setting field for a final preservation time indicating the time of an end point of a period in which the packet transferred through the connection indicated by the connection ID is continuously extracted. The field of Abnormality level is a setting field for an abnormality level calculated for the connection indicated by the connection ID. The field of Abnormality level expiration is a setting field for an abnormality level expiration indicating the time of an end point of the period of suppressing updating of the set abnormality level by an abnormality level smaller than the abnormality level. The field of Abnormality level history pointer is a setting field for a pointer to an abnormality level history that accumulates abnormality levels calculated in the past for the connection indicated by the connection ID.

(Content Stored in Abnormality Level History 800)

Next, an example of content stored in an abnormality level history 800 will be described with reference to FIG. 8. The abnormality level history 800 is implemented by a storage region such as the memory 302 or the recording medium 305 of the packet analysis device 100 illustrated in FIG. 3, for example.

FIG. 8 is a diagram illustrating an example of content stored in the abnormality level history 800. As illustrated in FIG. 8, the abnormality level history 800 has fields of Quantity, Next write position, Time, and Abnormality level. With information having been set in each of the fields of Time and Abnormality level, the abnormality level history 800 stores history information as a record.

The field of Quantity is a setting field for the maximum number of records of the abnormality level history 800. The field of Next write position is a setting field for a pointer that designates a record to be written next. The field of Time is a setting field for the time at which the abnormality level is calculated for a certain connection. The field of Abnormality level is a setting field for the abnormality level calculated for a certain connection. The abnormality level history 800 is prepared for each of abnormal connections.

(Content Stored in Abnormality Level Range List 900)

Next, an example of content stored in an abnormality level range list 900 will be described with reference to FIG. 9. The abnormality level range list 900 is implemented by a storage region such as the memory 302 or the recording medium 305 of the packet analysis device 100 illustrated in FIG. 3, for example.

Figure 9:
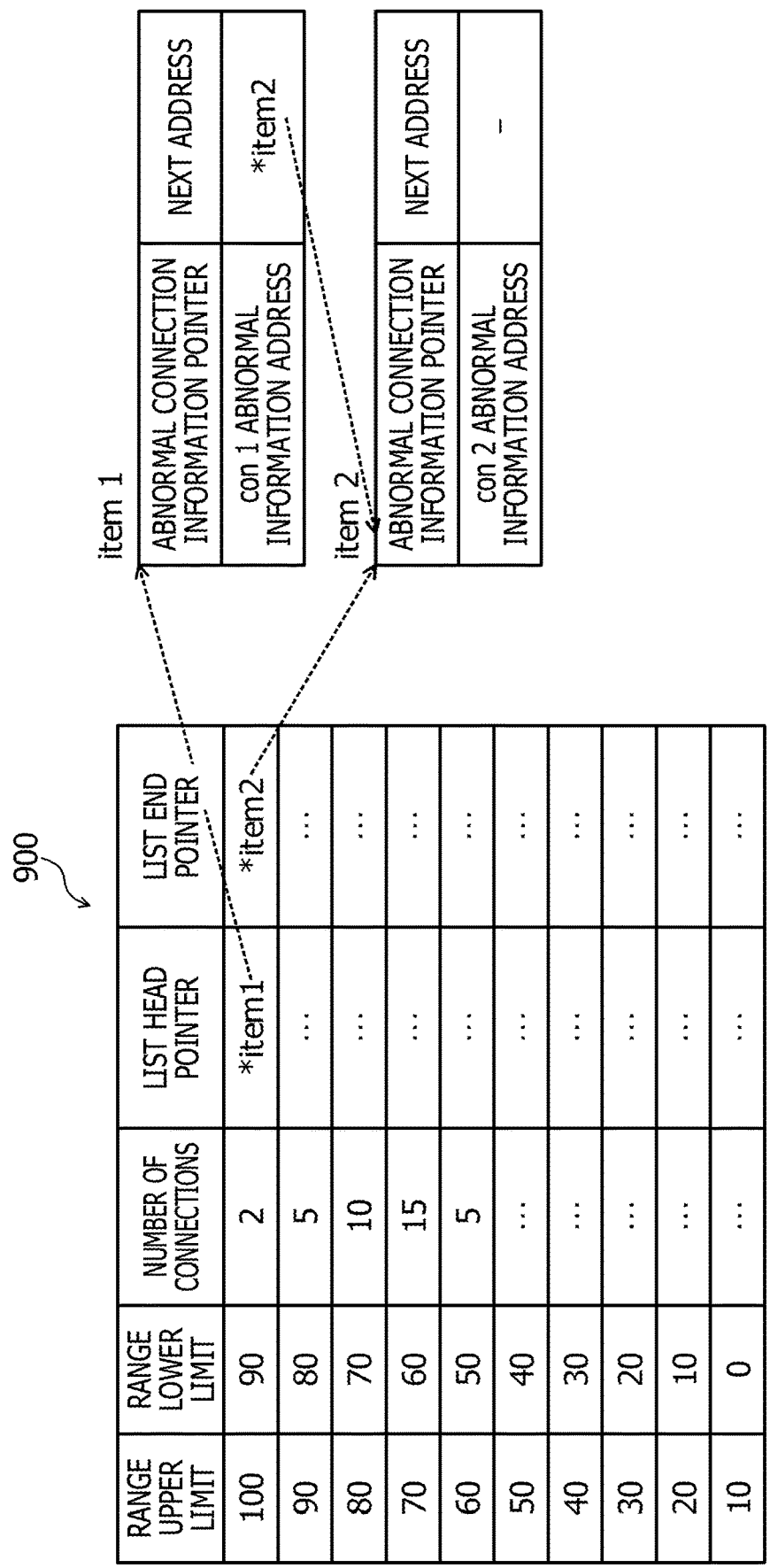
FIG. 9 is a diagram illustrating an example of content stored in an abnormality level range list 900.

FIG. 9 is a diagram illustrating an example of content stored in the abnormality level range list 900. As illustrated in FIG. 9, the abnormality level range list 900 includes fields of Range upper limit, Range lower limit, Number of connections, List head pointer, and List end pointer. The abnormality level range list 900 further includes items to be associated with the abnormality level range. With information having been set in each of the fields, the abnormality level range list 900 stores abnormality level range information as a record.

The field of Range upper limit is a setting field for an upper limit value of an abnormality level range. The field of Range lower limit is a setting field for a lower limit value of an abnormality level range. The abnormality level range is, for example, a range less than the upper limit value, and the lower limit value or more. In a case where the upper limit value is 100, the abnormality level range may be a range being the upper limit value or less. The field of Number of connections is a setting field for the number of abnormal connection information pointers to be associated with the abnormality level range.

The field of List head pointer is a setting field for a list head pointer that designates an item including the top abnormal connection information pointer among one or more abnormal connection information pointers to be associated with the abnormality level range. The field of List end pointer is a setting field for a list end pointer that designates an item including the end abnormal connection information pointer among one or more abnormal connection information pointers to be associated with the abnormality level range.

An item exists for each of abnormal connections, and has fields of Abnormal connection information pointer and Next address. The field of Abnormal connection information pointer is a setting field for a pointer to abnormal connection information of an abnormal connection to be associated with the abnormality level range. The field of Next address is a setting field for a pointer to an item for another abnormal connection associated with the same abnormality level range, next to the abnormal connection.

(Example of Functional Configuration of Packet Analysis Device 100)

Next, a functional configuration example of the packet analysis device 100 will be described with reference to FIG. 10.

Figure 10:
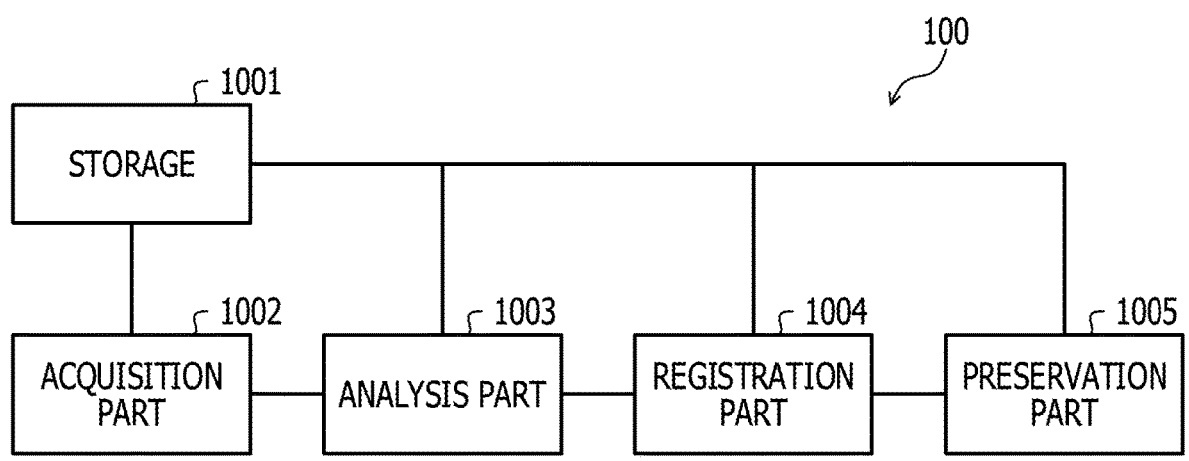
FIG. 10 is a block diagram indicating a functional configuration example of the packet analysis device 100.

FIG. 10 is a block diagram indicating a functional configuration example of the packet analysis device 100. As illustrated in FIG. 10, the packet analysis device 100 includes a storage 1001, an acquisition part 1002, an analysis part 1003, a registration part 1004, and a preservation part 1005.

For example, the storage 1001 is implemented by a storage region such as the memory 302 or the recording medium 305 illustrated in FIG. 3, for example. The acquisition part 1002 to the preservation part 1005 have functions as a control part. For example, the acquisition part 1002 to the preservation part 1005 implement their functions by causing the CPU 301 to execute a program stored in a storage region such as the memory 302 or the recording medium 305, or by the network I/F 303, illustrated in FIG. 3, for example. The processing result of individual functional parts is stored in a storage region such as the memory 302 or the recording medium 305, illustrated in FIG. 3, for example.

The storage 1001 implements the first storage 110. The storage 1001 implements, for example, a packet buffer with a ring buffer structure, and temporarily stores packets. For example, the storage 1001 manages the packet buffer using the index table 500, and implements the first storage 110. This configuration enables the storage 1001, when it determines abnormality of a connection, to enable readout of a packet transferred in the connection before the determination of abnormality of the connection.

The storage 1001 implements the second storage 120. The storage 1001 stores connection information regarding a connection used to transfer a certain packet, for example. The connection information includes information associating information indicating a connection used to transfer a certain packet with information regarding communication performance of the connection used to transfer the packet. The connection information includes information, for example, associating packet ID of a certain packet, information indicating a connection used to transfer the certain packet, and information regarding communication performance of the connection used to transfer the packet with each other.

The information indicating the connection is a connection ID assigned to the connection, for example. Examples of the information regarding the communication performance of the connection include the connection's packet loss rate, RU, server delay, or the like. The information regarding the communication performance of the connection may be an abnormality level of the connection obtained from the connection's packet loss rate, RU, server delay, or the like. The server delay is, for example, time taken from a point when the server device 230 receives a request from the client device 220 through processing in response to the request up to the point of returning a response to the client device 220. For example, the server delay represents a time on the packet analysis device 100 from a point of acquisition of a packet corresponding to a request received by the server device 230 from the client device 220 to a point of acquisition of a packet corresponding to a response returned from the server device 230 to the client device 220. For example, the storage 1001 implements the second storage 120 using the L4 analysis information table 600. With this configuration, the storage 1001 can store information used in determination as to whether a connection between certain devices is an abnormal connection.

The storage 1001 implements the third storage 130. The storage 1001 registers information indicating several connections in association with each of index value ranges of a plurality of prepared index value ranges, for example. An example of the index value is the abnormality level of the connection calculated on the basis of the connection's packet loss rate, RU, server delay, or the like. The index value range is an abnormality level range, for example. For example, the storage 1001 implements the third storage 130 using the abnormality level range list 900. With this configuration, the storage 1001 can store information used when the packet analysis device 100 decides which packet to extract from the first storage 110.

The storage 1001 implements the fourth storage 140. The storage 1001 stores a packet for a longer period than the first storage 110, for example. With this configuration, the storage 1001 can store packets used for analysis of various connections between certain devices, a network that connects certain devices, or the like, by the packet analysis device 100.

The acquisition part 1002 obtains a packet transferred between certain devices. Every time a packet is obtained, the acquisition part 1002 accumulates the obtained packet in the first storage 110. The acquisition part 1002 obtains a packet transferred between certain devices using, for example, a mirroring function of the relay device 240 and accumulates the packet in the first storage 110, and together with this, creates the index table 500. With this configuration, the acquisition part 1002 can temporarily store and manage a packet that can be used for analysis of a connection between certain devices, a network that connects certain devices, or the like.

The analysis part 1003 uses a packet obtained by the acquisition part 1002 and accumulates information regarding communication performance of a connection used for the transfer of the packet into the second storage 120 in association with information indicating the connection used for the transfer of the packet. For example, every time a packet is obtained, the packet analysis device 100 performs L4 analysis on the basis of the obtained packet, and then, stores connection information regarding the connection used for the transfer of the packet, in the connection table 400. With this configuration, the analysis part 1003 can store connection information used at decision as to which index value range is used for associating a connection between certain devices.

With reference to the second storage 120, the registration part 1004 performs, for each of connections at predetermined time intervals, registration of information indicating the connection in the third storage 130 in association with any of a plurality of index value ranges including an index value indicating communication performance of the connection. The registration part 1004 registers abnormal connection information corresponding to a connection in association with, every five seconds for example, any of a plurality of abnormality level ranges indicated by the abnormality level range list 900 including the abnormality level of the connection generated between certain devices. The abnormal connection information includes information indicating a connection used to transfer the packet having possibility to be extracted. The abnormal connection information includes a connection ID, for example, as information indicating a connection. This enables the registration part 1004 to register, with a relatively low processing load, connection information used at selection of a packet to be extracted from the packet buffer.

For example, the registration part 1004 determines whether the index value indicating the communication performance of the first connection is an index value indicating predetermined communication performance or less. In a case where the index value is an index value indicating predetermined communication performance or less, the registration part 1004 registers information indicating the first connection in the third storage 130 in association with any of a plurality of index value ranges including the index value. For example, in a case where the abnormality level of the first connection is a threshold or more, the registration part 1004 registers abnormal connection information corresponding to the first connection in association with an abnormality level range including the abnormality level. This configuration enables the registration part 1004 to easily extract a packet transferred through an abnormal connection, which has a relatively high abnormality level and a relatively high possibility of performing a post-active and detailed analysis. In contrast, this configuration enables the registration part 1004 to suppress extraction of a packet transferred through an abnormal connection, which has a relatively low abnormality level and a relatively low possibility of performing a post-active and detailed analysis and suppress occurrence of shortage of storage region of a preservation file.

For example, in a case where the information indicating the first connection is registered in the third storage 130, the registration part 1004 sets the expiration of a registration state of the information indicating the first connection in the third storage 130 to a time after a certain time from the current time. The registration part 1004 can suppress, until the expiration, the information indicating the first connection from being associated with the abnormality level range indicating that the communication performance is lower than the currently associated abnormality level range. With this configuration, the registration part 1004 can suppress, until the expiration, a failure in storing in a preservation file, of a packet that has been transferred through an abnormal connection having a temporarily high abnormality level and that is to be preferably stored in the preservation file, along a decrease in the abnormality level.

The registration part 1004 determines whether a change in the index value indicating the communication performance of the first connection indicates reduction in the communication performance of the first connection. In a case where the change indicates reduction in communication performance of the first connection, the registration part 1004 re-registers the information indicating the first connection in the third storage 130 in association with the index value range including the index value indicating the communication performance of the first connection. Furthermore, the registration part 1004 re-sets the expiration to a time after a certain time from the current time. For example, in a case where the abnormality level of the abnormal connection increases, the registration part 1004 re-associates the abnormal connection information regarding the abnormal connection to the abnormality level range including the abnormality level. This makes it easy for the registration part 1004 to preferentially store, in the preservation file, the packet that has an increased abnormality level and that is to be preferably stored in the preservation file. Furthermore, the registration part 1004 can facilitate storage of the packet in the preservation file for a certain time after occurrence of the increase in the abnormality level.

For example, in a case where the change in the index value indicating the communication performance of the first connection indicates improvement of the communication performance of the first connection, the registration part 1004 would not alter the registration state of the information indicating the first connection to the third storage 130. For example, in a case where the abnormality level indicating the communication performance of the first connection is lowered, the registration part 1004 is capable of suppressing alteration of the registration state of the information indicating the first connection to the abnormality level range. This would make it possible to suppress, by the packet analysis device 100, a situation in which the packet transferred through the first connection remains unextracted immediately after the abnormality level is lowered.

For example, the registration part 1004 determines whether the change in the index value indicating the communication performance of the first connection indicates improvement of the communication performance of the first connection, and determines whether the index value changed is included in the index value range currently associated with the information indicating the first connection. In a case where the registration part 1004 determines that the change indicates improvement and the value is included in the index value range, the registration part 1004 re-sets the expiration to a time after a certain time from the current time. For example, in a case where the abnormality level indicating the communication performance of the first connection decreases and is included in the currently associated abnormality level range, the registration part 1004 re-sets the expiration to a time after a certain time from the current time. With this configuration, the registration part 1004 can extract a packet for a longer period and store it in the preservation file in a case where the abnormality continues in the abnormal connection.

For example, when the expiration comes, the registration part 1004 re-registers the information indicating the first connection in the third storage 130 in association with any index value range including one of a plurality of index values indicating communication performance of the first connection within a predetermined period. The registration part 1004 re-sets the expiration to a time after a certain time from the current time. For example, the registration part 1004 refers to the abnormality level history 800, and re-registers information indicating the first connection using the maximum abnormality level in the abnormality level history 800. With this configuration, the registration part 1004 can improve the possibility of being able to use the abnormality level which is to be preferably used in registration of abnormal connection information, as compared with the case of using an abnormality level at the current time alone. This would make it easy for the registration part 1004 to further effectively extract packets transferred through the abnormal connection, which is to be preferably stored in the preservation file.

For example, the registration part 1004 determines whether the index value indicating the communication performance of the first connection is an index value indicating predetermined communication performance or less. In a case where the index value is an index value indicating predetermined communication performance or less, the registration part 1004 sets a retention time limit for the registration state of the information indicating the first connection to the third storage 130 to the time after a certain time from the current time. In a case where the retention time limit has passed, the registration part 1004 deletes the registration state of the information indicating the first connection to the third storage 130. This enables the registration part 1004 to suppress storage of the packet that has passed the retention time limit and having lowered possibility of being used at a post-active and detailed analysis of connection and preferably being not stored in the preservation file, in the preservation file. This leads to the capability of the registration part 1004 of suppressing an increase in the number of packets to be stored in the preservation file.

The preservation part 1005 refers to the third storage 130 and extracts a packet transferred through the connection corresponding to a specific index value range out of the packets accumulated in the first storage 110 for which a predetermined time has elapsed since acquisition, and stores the extracted packet in the fourth storage 140. The specific index value range is, for example, a set of one or more index value ranges in which the number of pieces of associated abnormal connection information is a predetermined number or less. The specific index value range may be a range from a preset upper limit value to a lower limit value, for example.

The preservation part 1005 extracts packets transferred through abnormal connection corresponding to a specific abnormality level range "91 to 100" out of the packets accumulated in the packet buffer and for which a predetermined time has elapsed since acquisition, and stores the extracted packets in the preservation file, for example. This enables the preservation part 1005 to extract the packet before deletion of the packet from the packet buffer. Moreover, the preservation part 1005 can limit the number of packets to be extracted.

The preservation part 1005 may set a specific abnormality level range so that the number of abnormal connections from which packets are extracted is a predetermined number or less, and may extract packets transferred through the abnormal connection corresponding to the specific abnormality level range, for example. This enables the preservation part 1005 to extract the packet before deletion of the packet from the packet buffer. Moreover, the preservation part 1005 can limit the number of packets to be extracted.

The preservation part 1005 may further output a result stored in the fourth storage 140. The output is implemented as display on a display, print output to a printer, transmission to an external device by the network I/F 303, output to predetermined analysis software, and the like, for example. An example of the predetermined analysis software is, for example, software that analyzes a connection between certain devices, a network 210 connecting certain devices, or the like. With this configuration, the preservation part 1005 can allow the user, an external device, predetermined analysis software, or the like to analyze a connection between certain devices, a network 210 connecting certain devices, or the like.

(Functional Configuration Example of Packet Analysis Device 100)

Next, a functional configuration example of the packet analysis device 100 will be described with reference to FIG. 11.

Figure 11:
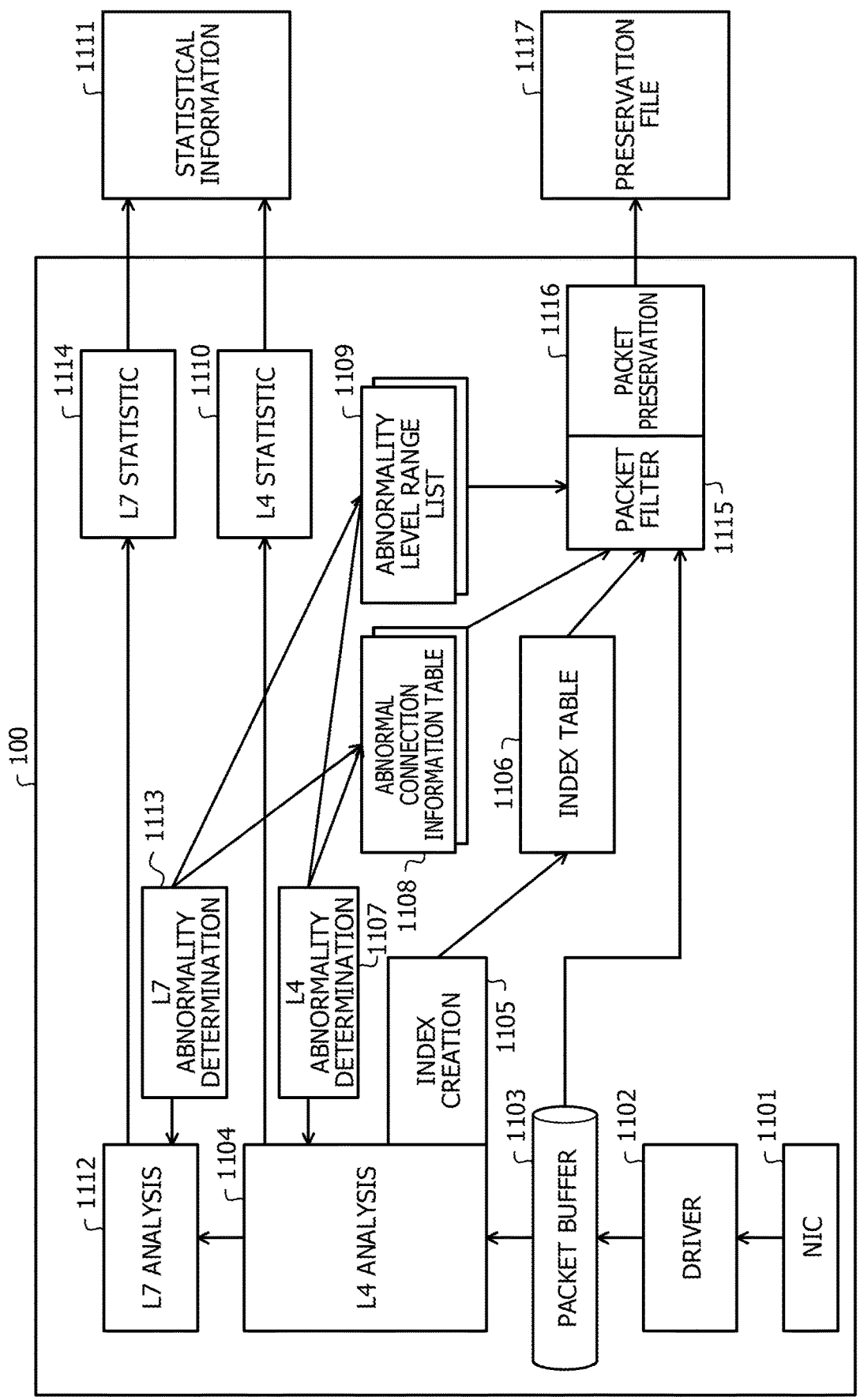
FIG. 11 is a block diagram indicating an example of a functional configuration of the packet analysis device 100.

FIG. 11 is a block diagram indicating an example of a functional configuration of the packet analysis device 100. As illustrated in FIG. 11, the packet analysis device 100 includes a network interface card (NIC) 1101, a driver 1102, and a packet buffer 1103. The NIC 1101 uses a mirroring function of the relay device 240 such as a switch or a TAP and obtains a packet transferred between certain devices. The NIC 1101 outputs the obtained packet to the driver 1102. The driver 1102 has input of a packet and accumulates the packet in the packet buffer 1103. The packet buffer 1103 has a ring buffer structure, and stores packets for a relatively short period.

The packet analysis device 100 includes an L4 analysis 1104, index creation 1105, and an index table 1106 (500). After a packet is stored in the packet buffer 1103, the L4 analysis 1104 analyzes a connection used to transfer the packet on the basis of the packet, and updates the L4 analysis information table 600. The L4 analysis 1104 calculates the Number of packets on transmission side, the Number of bytes on transmission side, the Number of losses on transmission side, the Number of packets on reception side, the Number of bytes on reception side, the Number of losses on reception side, an RU average value, a server delay average value, or the like, for the connection used to transfer the packet. After a packet is stored in the packet buffer 1103, the index creation 1105 stores a record associating Packet ID, Connection ID, and Reception date and time with each other in the index table 1106 (500) on the basis of the header information of the packet.

The packet analysis device 100 further includes L4 abnormality determination 1107, an abnormal connection information table 1108 (700), an abnormality level range list 1109 (900), L4 statistic 1110, and statistical information 1111. The L4 abnormality determination 1107 refers to the L4 analysis information table 600 and determines whether the connection used to transfer a certain packet is an abnormal connection. In a case where the connection is an abnormal connection, the L4 abnormality determination 1107 updates the abnormal connection information table 1108 (700) and the abnormality level range list 1109 (900). The L4 statistic 1110 updates the statistical information 1111 with reference to the L4 analysis information table 600.

In addition, the packet analysis device 100 includes an L7 analysis 1112, an L7 abnormality determination 1113, and an L7 statistic 1114. The L7 analysis 1112 refers to the packet buffer 1103 and the L4 analysis information table 600 and analyzes a layer 7. The L7 abnormality determination 1113 refers to the analysis result on the layer 7 and determines whether the connection used for the transfer of a certain packet is an abnormal connection. In a case where the connection is an abnormal connection, the L7 abnormality determination 1113 updates the abnormal connection information table 1108 (700) and the abnormality level range list 1109 (900). The L7 statistic 1114 updates the statistical information 1111 with reference to the analysis result on the layer 7.

The packet analysis device 100 further includes a packet filter 1115, a packet preservation 1116, and a preservation file 1117. The packet filter 1115 refers to the index table 1106 (500), and selects a packet for which a predetermined time has elapsed since acquisition. The packet filter 1115 refers to the abnormal connection information table 1108 (700), and determines whether the selected packet is to be extracted and stored in the preservation file 1117. When it is determined to extract and store the packet, the packet filter 1115 extracts the selected packet and outputs the selected packet to the packet preservation 1116. The packet preservation 1116 writes the packet to the preservation file 1117.

First Example

Next, an operation example of the packet analysis device 100 according to a first example will be described with reference to FIGS. 12 to 15. First, a first operation example of the packet analysis device 100 according to the first example will be described with reference to FIG. 12.

Figure 12:
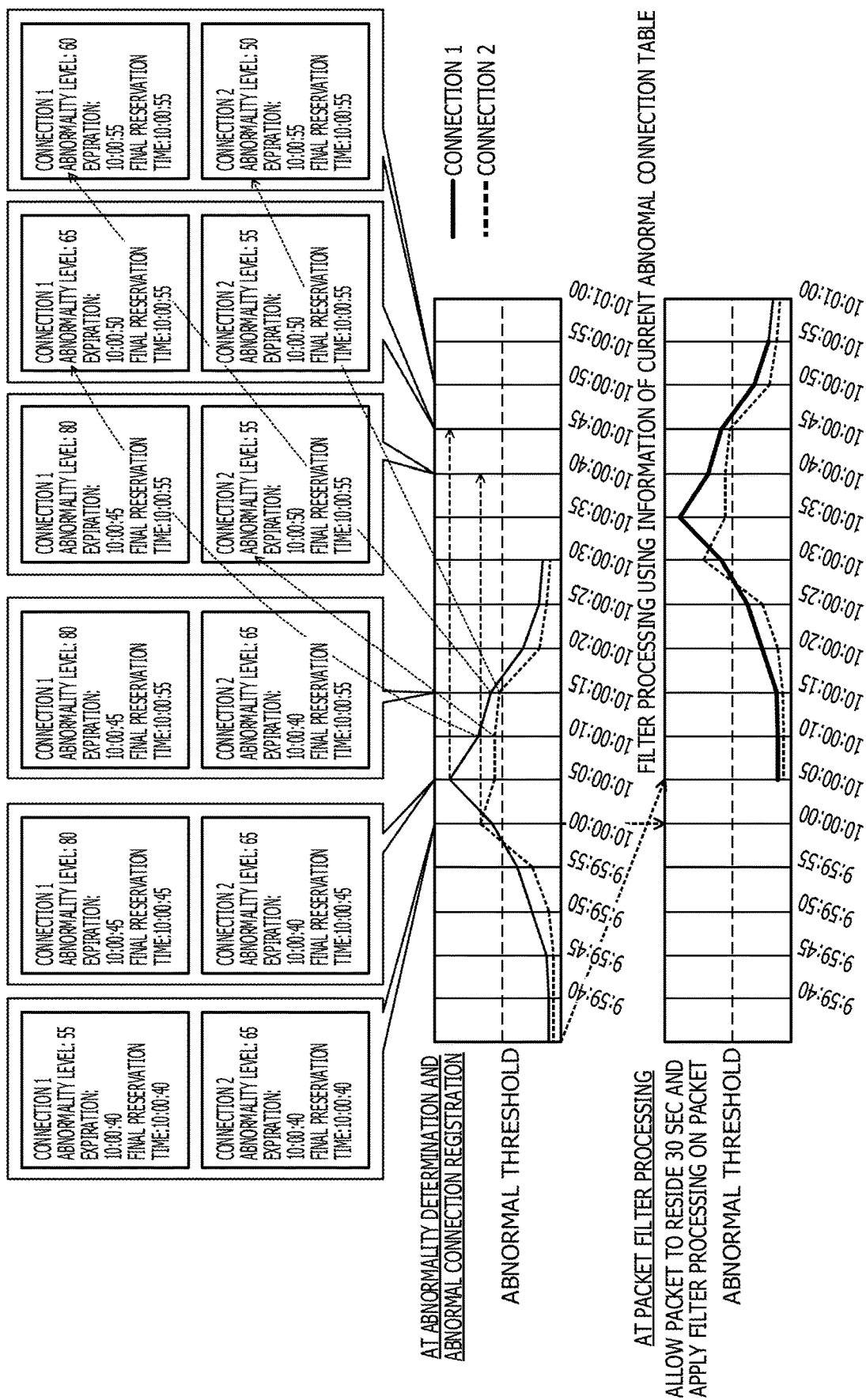
FIG. 12 is a diagram illustrating a first operation example of the packet analysis device 100.

FIG. 12 is a diagram illustrating the first operation example of the packet analysis device 100. For simplification of description, the example of FIG. 12 will describe which of the packets transferred through connection 1 or connection 2 is to be preferentially stored by the packet analysis device 100 at time 9:59:35 to 10:01:00. The packet analysis device 100 updates the abnormal connection information associated with the abnormality level range list 900 every five seconds.

First, the time is 9:59:35. Here, the packet analysis device 100 stores a newly obtained packet of connection 1 in the packet buffer, calculates an abnormality level of connection 1, and then, determines that the abnormality level is less than the threshold "50". Accordingly, the packet analysis device 100 decides that the connection 1 is not an abnormal connection.

Moreover, the packet analysis device 100 stores a newly obtained packet of connection 2 in the packet buffer, calculates an abnormality level of connection 2, and then, determines that the abnormality level is less than the threshold "50". Accordingly, the packet analysis device 100 decides that the connection 2 is not an abnormal connection.

Similarly, in a time range of 9:59:40 to 9:59:55, the packet analysis device 100 stores newly obtained packets of connections 1 and 2 in the packet buffer every five seconds, and decides that the connections 1 and 2 are not abnormal connections.

Next, the time will be 10:00:00. Here, the packet analysis device 100 stores a newly obtained packet of connection 1 in the packet buffer, calculates an abnormality level "55" of connection 1, and then, determines that the abnormality level is the threshold "50" or more. Accordingly, the packet analysis device 100 decides that the connection 1 is an abnormal connection, and generates abnormal connection information for the connection 1.

For example, the packet analysis device 100 generates abnormal connection information including calculated abnormality level "55", the time "10:00:40", that is, 40 seconds after the current point as the expiration, and the time "10:00:40", that is, 40 seconds after the current point as the final preservation time. Thereafter, the packet analysis device 100 registers the abnormal connection information for the generated connection 1 in association with the abnormality level range "50 to 60" of the abnormality level range list 900.

Moreover, the packet analysis device 100 stores a newly obtained packet of connection 2 in the packet buffer, calculates an abnormality level "65" of connection 2, and then, determines that the abnormality level is the threshold "50" or more. Accordingly, the packet analysis device 100 decides that the connection 2 is an abnormal connection, and generates abnormal connection information for the connection 2.

For example, the packet analysis device 100 generates abnormal connection information including calculated abnormality level "65", the time "10:00:40", that is, 40 seconds after the current point as the expiration, and the time "10:00:40", that is, 40 seconds after the current point as the final preservation time. Thereafter, the packet analysis device 100 registers the abnormal connection information for the generated connection 2 in association with the abnormality level range "60 to 70" of the abnormality level range list 900.

Next, the time will be 10:00:05. Here, the packet analysis device 100 stores a newly obtained packet of connection 1 in the packet buffer, calculates an abnormality level "80" of connection 1, and then, determines that the abnormality level is the threshold "50" or more. Accordingly, the packet analysis device 100 decides that the connection 1 is an abnormal connection, determines that the abnormality level of the connection 1 has increased from "55" to "80", and updates the abnormal connection information for the connection 1.

For example, since the abnormality level of the connection 1 has increased, the packet analysis device 100 updates the abnormality level of the abnormal connection information for the connection 1 to the newly calculated abnormality level "80". For example, since the abnormality level of the connection 1 has increased, the packet analysis device 100 updates the expiration of the abnormal connection information for the connection 1 to the time "10:00:45", that is, 40 seconds after the current point. For example, since the connection 1 is an abnormal connection, the packet analysis device 100 updates the final preservation time of the abnormal connection information for the connection 1 to the time "10:00:45", that is, 40 seconds after the current point. Thereafter, the packet analysis device 100 re-registers the abnormal connection information for the updated connection 1 in association with the abnormality level range "80 to 90" of the abnormality level range list 900.

Moreover, the packet analysis device 100 stores a newly obtained packet of connection 2 in the packet buffer, calculates an abnormality level of connection 2, and then, determines that the abnormality level is the threshold "50" or more. Accordingly, the packet analysis device 100 decides that the connection 2 is an abnormal connection, determines that the abnormality level of the connection 2 has decreased, and updates the abnormal connection information for the connection 2.

For example, since the abnormality level of the connection 2 has decreased, the packet analysis device 100 will not update the abnormality level "65" of the abnormal connection information for the connection 2 and the expiration "10:00:40". For example, since the connection 2 is an abnormal connection, the packet analysis device 100 updates the final preservation time of the abnormal connection information for the connection 2 to the time "10:00:45", that is, 40 seconds after the current point. Thereafter, the packet analysis device 100 re-registers the abnormal connection information for the updated connection 2 in association with the abnormality level range "60 to 70" of the abnormality level range list 900.

Next, the time will be 10:00:10. Here, the packet analysis device 100 determines that there is a packet in the packet buffer that has been transferred on connections 1 and 2 at past times 9:59:35 to 9:59:40 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

Moreover, the packet analysis device 100 stores a newly obtained packet of connection 1 in the packet buffer, calculates an abnormality level of connection 1, and then, determines that the abnormality level is the threshold "50" or more. Accordingly, the packet analysis device 100 decides that the connection 1 is an abnormal connection, determines that the abnormality level of the connection 1 has decreased, and updates the abnormal connection information for the connection 1.

For example, since the abnormality level of the connection 1 has decreased, the packet analysis device 100 will not update the abnormality level "80" of the abnormal connection information for the connection 1 and the expiration "10:00:45". For example, since the connection 1 is an abnormal connection, the packet analysis device 100 updates the final preservation time of the abnormal connection information for the connection 1 to the time "10:00:50", that is, 40 seconds after the current point. Thereafter, the packet analysis device 100 re-registers the abnormal connection information for the updated connection 1 in association with the abnormality level range "80 to 90" of the abnormality level range list 900.

Moreover, the packet analysis device 100 stores a newly obtained packet of connection 2 in the packet buffer, calculates an abnormality level of connection 2, and then, determines that the abnormality level is the threshold "50" or more. Accordingly, the packet analysis device 100 decides that the connection 2 is an abnormal connection, determines that the abnormality level of the connection 2 has decreased, and updates the abnormal connection information for the connection 2.

For example, since the abnormality level of the connection 2 has decreased, the packet analysis device 100 will not update the abnormality level "65" of the abnormal connection information for the connection 2 and the expiration "10:00:40". For example, since the connection 2 is an abnormal connection, the packet analysis device 100 updates the final preservation time of the abnormal connection information for the connection 2 to the time "10:00:50", that is, 40 seconds after the current point. Thereafter, the packet analysis device 100 re-registers the abnormal connection information for the updated connection 2 in association with the abnormality level range "60 to 70" of the abnormality level range list 900.

Next, the time will be 10:00:15. Here, the packet analysis device 100 determines that there is a packet in the packet buffer that has been transferred on connections 1 and 2 at past times 9:59:40 to 9:59:45 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

Moreover, the packet analysis device 100 stores a newly obtained packet of connection 1 in the packet buffer, calculates an abnormality level of connection 1, and then, determines that the abnormality level is the threshold "50" or more. Accordingly, the packet analysis device 100 decides that the connection 1 is an abnormal connection, determines that the abnormality level of the connection 1 has decreased, and updates the abnormal connection information for the connection 1.

For example, since the abnormality level of the connection 1 has decreased, the packet analysis device 100 will not update the abnormality level "80" of the abnormal connection information for the connection 1 and the expiration "10:00:45". For example, since the connection 1 is an abnormal connection, the packet analysis device 100 updates the final preservation time of the abnormal connection information for the connection 1 to the time "10:00:55", that is, 40 seconds after the current point. Thereafter, the packet analysis device 100 re-registers the abnormal connection information for the updated connection 1 in association with the abnormality level range "80 to 90" of the abnormality level range list 900.

Moreover, the packet analysis device 100 stores a newly obtained packet of connection 2 in the packet buffer, calculates an abnormality level of connection 2, and then, determines that the abnormality level is the threshold "50" or more. Accordingly, the packet analysis device 100 decides that the connection 2 is an abnormal connection, determines that the abnormality level of the connection 2 has decreased, and updates the abnormal connection information for the connection 2.

For example, since the abnormality level of the connection 2 has decreased, the packet analysis device 100 will not update the abnormality level "65" of the abnormal connection information for the connection 2 and the expiration "10:00:40". For example, since the connection 2 is an abnormal connection, the packet analysis device 100 updates the final preservation time of the abnormal connection information for the connection 2 to the time "10:00:55", that is, 40 seconds after the current point. Thereafter, the packet analysis device 100 re-registers the abnormal connection information for the updated connection 2 in association with the abnormality level range "60 to 70" of the abnormality level range list 900.

Next, the time will be 10:00:20. Here, the packet analysis device 100 determines that there is a packet in the packet buffer that has been transferred on connections 1 and 2 at past times 9:59:45 to 9:59:50 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

Moreover, the packet analysis device 100 stores a newly obtained packet of connection 1 in the packet buffer, calculates an abnormality level of connection 1, and then, determines that the abnormality level is less than the threshold "50". Accordingly, the packet analysis device 100 decides that the connection 1 is not an abnormal connection.

Moreover, the packet analysis device 100 stores a newly obtained packet of connection 2 in the packet buffer, calculates an abnormality level of connection 2, and then, determines that the abnormality level is less than the threshold "50". Accordingly, the packet analysis device 100 decides that the connection 2 is not an abnormal connection.

Similarly, during time 10:00:25 to 10:00:35, the packet analysis device 100 preferentially stores, in the preservation file, the packet transferred by the connection 1 out of the packets for which 30 seconds have elapsed after acquisition.

The packet analysis device 100 decides that the connections 1 and 2 are not abnormal connections.

Next, the time will be 10:00:40. Here, the packet analysis device 100 determines that there is a packet in the packet buffer that has been transferred on connections 1 and 2 at past times 10:00:05 to 10:00:10 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

The packet analysis device 100 detects that the abnormal connection information for the connection 2 has passed expiration. On the basis of the abnormality level history 800, the packet analysis device 100 updates the abnormality level of the abnormal connection information for the connection 2 to the abnormality level "55" of the time "10:00:10" stored in the abnormality level history 800. The details of updating the abnormality level by the packet analysis device 100 on the basis of the abnormality level history 800 will be described below with reference to FIG. 15.

The packet analysis device 100 updates the expiration of the abnormal connection information for the connection 2 to time "10:00:50", that is, 40 seconds after the time "10:00:10" of the abnormality level history 800. The packet analysis device 100 will not update, for example, the final preservation time of the abnormal connection information for the connection 2. Thereafter, the packet analysis device 100 re-registers the abnormal connection information for the updated connection 2 in association with the abnormality level range "50 to 60" of the abnormality level range list 900.

Next, the time will be 10:00:45. Here, the packet analysis device 100 determines that there is a packet in the packet buffer that has been transferred on connections 1 and 2 at past times 10:00:10 to 10:00:15 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

The packet analysis device 100 detects that the abnormal connection information for the connection 1 has passed expiration. On the basis of the abnormality level history 800, the packet analysis device 100 updates the abnormality level of the abnormal connection information for the connection 1 to the abnormality level "65" of the time "10:00:10" stored in the abnormality level history 800. The details of updating the abnormality level by the packet analysis device 100 on the basis of the abnormality level history 800 will be described below with reference to FIG. 15.

The packet analysis device 100 updates the expiration of the abnormal connection information for the connection 1 to time "10:00:50", that is, 40 seconds after the time "10:00:10" of the abnormality level history 800. The packet analysis device 100 will not update, for example, the final preservation time of the abnormal connection information for the connection 1. Thereafter, the packet analysis device 100 re-registers the abnormal connection information for the updated connection 1 in association with the abnormality level range "60 to 70" of the abnormality level range list 900.

Next, the time will be 10:00:50. Here, the packet analysis device 100 determines that there is a packet in the packet buffer that has been transferred on connections 1 and 2 at past times 10:00:15 to 10:00:20 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

The packet analysis device 100 detects that the abnormal connection information for the connection 1 has passed expiration. On the basis of the abnormality level history 800, the packet analysis device 100 updates the abnormality level of the abnormal connection information for connection 1 to the abnormality level "60" of the time "10:00:15" stored in the abnormality level history 800. The details of updating the abnormality level by the packet analysis device 100 on the basis of the abnormality level history 800 will be described below with reference to FIG. 15.

The packet analysis device 100 updates the expiration of the abnormal connection information for the connection 1 to time "10:00:55", that is, 40 seconds after the time "10:00:15" of the abnormality level history 800. The packet analysis device 100 will not update, for example, the final preservation time of the abnormal connection information for the connection 1. Thereafter, the packet analysis device 100 re-registers the abnormal connection information for the updated connection 1 in association with the abnormality level range "60 to 70" of the abnormality level range list 900.

The packet analysis device 100 detects that the abnormal connection information for the connection 2 has passed expiration. On the basis of the abnormality level history 800, the packet analysis device 100 updates the abnormality level of the abnormal connection information for the connection 2 to the abnormality level "50" of the time "10:00:15" stored in the abnormality level history 800. The details of updating the abnormality level by the packet analysis device 100 on the basis of the abnormality level history 800 will be described below with reference to FIG. 15.

The packet analysis device 100 updates the expiration of the abnormal connection information for the connection 2 to time "10:00:55", that is, 40 seconds after the time "10:00:15" of the abnormality level history 800. The packet analysis device 100 will not update, for example, the final preservation time of the abnormal connection information for the connection 2. Thereafter, the packet analysis device 100 re-registers the abnormal connection information for the updated connection 2 in association with the abnormality level range "50 to 60" of the abnormality level range list 900.

Next, the time will be 10:00:55. Here, the packet analysis device 100 determines that there is a packet in the packet buffer that has been transferred on connections 1 and 2 at past times 10:00:20 to 10:00:25 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

The packet analysis device 100 detects that the abnormal connection information for the connections 1 and 2 has reached the final preservation time. The packet analysis device 100 deletes the abnormal connection information for the connections 1 and 2 registered in association with the abnormality level range of the abnormality level range list 900.

With this configuration, the packet analysis device 100 can preferentially store the packets transferred by the abnormal connection, which is relatively preferable to be stored in the preservation file, out of the packets transferred by the plurality of abnormal connections.

Here, there might be a conceivable case of deciding a target packet to be stored in terms of which connection has been used to transfer the packet on the basis of the abnormality level when the threshold is first exceeded, among the plurality of abnormal connections. When this case is applied to the example of FIG. 12, however, the packet transferred through the connection 2 having a maximum value of an abnormality level being relatively smaller than the packet transferred through the connection 1 having relatively greater maximum value of the abnormality level might be preferentially stored in some cases. Fortunately however, the packet analysis device 100 can preferentially store the packets transferred through the connection 1 having a relatively great maximum value of the abnormality level.

Next, a second operation example of the packet analysis device 100 according to the first example will be described with reference to FIG. 13.

Figure 13:
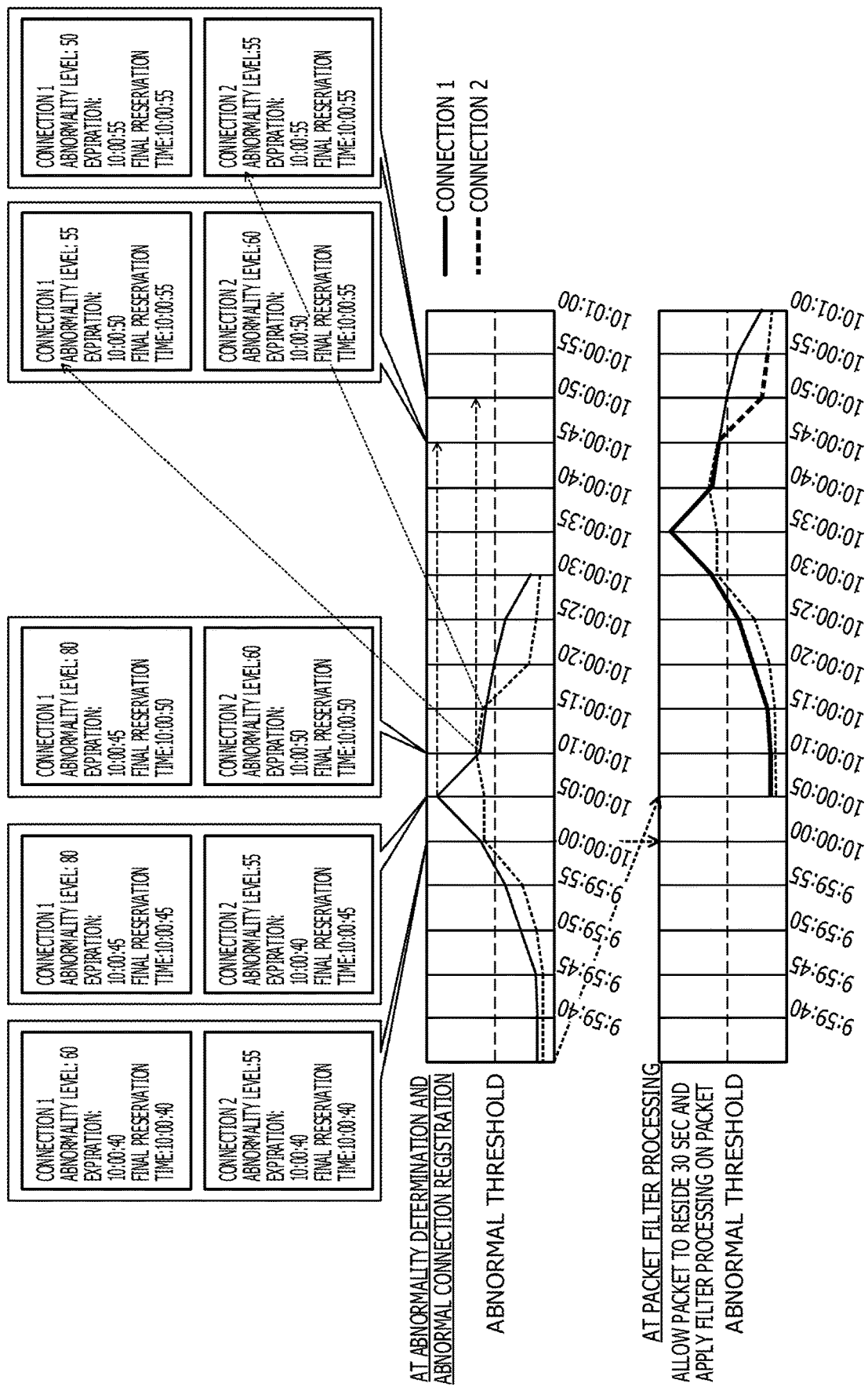
FIG. 13 is a diagram illustrating a second operation example of the packet analysis device 100.

FIG. 13 is a diagram illustrating a second operation example of the packet analysis device 100. For simplification of description, the example of FIG. 13 will describe which of the packets transferred through connection 1 or connection 2 is to be preferentially stored by the packet analysis device 100 at time 9:59:35 to time 10:01:00. The packet analysis device 100 updates the abnormal connection information associated with the abnormality level range list 900 every five seconds.

First, the time is 9:59:35. Here, the packet analysis device 100 stores a newly obtained packet of connection 1 in the packet buffer, calculates an abnormality level of connection 1, and then, determines that the abnormality level is less than the threshold "50". Accordingly, the packet analysis device 100 decides that the connection 1 is not an abnormal connection.

Moreover, the packet analysis device 100 stores a newly obtained packet of connection 2 in the packet buffer, calculates an abnormality level of connection 2, and then, determines that the abnormality level is less than the threshold "50". Accordingly, the packet analysis device 100 decides that the connection 2 is not an abnormal connection.

Similarly, in a time range of 9:59:40 to 9:59:55, the packet analysis device 100 stores newly obtained packets of connections 1 and 2 in the packet buffer, and decides that the connections 1 and 2 are not abnormal connections.

Next, the time will be 10:00:00. Here, the packet analysis device 100 stores the newly obtained packet of the connection 1 in the packet buffer, calculates the abnormality level "60" of the connection 1, and determines that the abnormality level is the threshold "50" or more. Accordingly, the packet analysis device 100 decides that the connection 1 is an abnormal connection, and generates abnormal connection information for the connection 1.

For example, the packet analysis device 100 generates abnormal connection information including calculated abnormality level "60", the time "10:00:40", that is, 40 seconds after the current point as the expiration, and the time "10:00:40" that is, 40 seconds after the current point as the final preservation time. Thereafter, the packet analysis device 100 registers the abnormal connection information for the generated connection 1 in association with the abnormality level range "60 to 70" of the abnormality level range list 900.

Moreover, the packet analysis device 100 stores a newly obtained packet of connection 2 in the packet buffer, calculates an abnormality level "55" of connection 2, and then, determines that the abnormality level is the threshold "50" or more. Accordingly, the packet analysis device 100 decides that the connection 2 is an abnormal connection, and generates abnormal connection information for the connection 2.

For example, the packet analysis device 100 generates abnormal connection information including calculated abnormality level "55", the time "10:00:40", that is, 40 seconds after the current point as the expiration, and the time "10:00:40", that is, 40 seconds after the current point as the final preservation time. Thereafter, the packet analysis device 100 registers the abnormal connection information for the generated connection 2 in association with the abnormality level range "50 to 60" of the abnormality level range list 900.

Next, the time will be 10:00:05. Here, the packet analysis device 100 stores a newly obtained packet of connection 1 in the packet buffer, calculates an abnormality level "80" of connection 1, and then, determines that the abnormality level is the threshold "50" or more. Accordingly, the packet analysis device 100 decides that the connection 1 is an abnormal connection, determines that the abnormality level of the connection 1 has increased from "55" to "80", and updates the abnormal connection information for the connection 1.

For example, since the abnormality level of the connection 1 has increased, the packet analysis device 100 updates the abnormality level of the abnormal connection information for the connection 1 to the newly calculated abnormality level "80". For example, since the abnormality level of the connection 1 has increased, the packet analysis device 100 updates the expiration of the abnormal connection information for the connection 1 to the time "10:00:45", that is, 40 seconds after the current point. For example, since the connection 1 is an abnormal connection, the packet analysis device 100 updates the final preservation time of the abnormal connection information for the connection 1 to the time "10:00:45", that is, 40 seconds after the current point. Thereafter, the packet analysis device 100 re-registers the abnormal connection information for the updated connection 1 in association with the abnormality level range "80 to 90" of the abnormality level range list 900.

Moreover, the packet analysis device 100 stores a newly obtained packet of connection 2 in the packet buffer, calculates an abnormality level "55" of connection 2, and then, determines that the abnormality level is the threshold "50" or more. Accordingly, the packet analysis device 100 decides that the connection 2 is an abnormal connection, determines that the abnormality level of the connection 2 has not changed, and updates the abnormal connection information for the connection 2.

For example, since the abnormality level of the connection 2 has not changed, the packet analysis device 100 will not update the abnormality level "55" of the abnormal connection information for the connection 2 and the expiration "10:00:40". For example, since the connection 2 is an abnormal connection, the packet analysis device 100 updates the final preservation time of the abnormal connection information for the connection 2 to the time "10:00:45", that is, 40 seconds after the current point. Thereafter, the packet analysis device 100 re-registers the abnormal connection information for the updated connection 2 in association with the abnormality level range "50 to 60" of the abnormality level range list 900.

Next, the time will be 10:00:10. Here, the packet analysis device 100 determines that there is a packet in the packet buffer that has been transferred on connections 1 and 2 at past times 9:59:35 to 9:59:40 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

Moreover, the packet analysis device 100 stores a newly obtained packet of connection 1 in the packet buffer, calculates an abnormality level of connection 1, and then, determines that the abnormality level is the threshold "50" or more. Accordingly, the packet analysis device 100 decides that the connection 1 is an abnormal connection, determines that the abnormality level of the connection 1 has decreased, and updates the abnormal connection information for the connection 1.

For example, since the abnormality level of the connection 1 has decreased, the packet analysis device 100 will not update the abnormality level "80" of the abnormal connection information for the connection 1 and the expiration "10:00:45". For example, since the connection 1 is an abnormal connection, the packet analysis device 100 updates the final preservation time of the abnormal connection information for the connection 1 to the time "10:00:50", that is, 40 seconds after the current point. Thereafter, the packet analysis device 100 re-registers the abnormal connection information for the updated connection 1 in association with the abnormality level range "80 to 90" of the abnormality level range list 900.

Moreover, the packet analysis device 100 stores a newly obtained packet of connection 2 in the packet buffer, calculates an abnormality level "60" of connection 2, and then, determines that the abnormality level is the threshold "50" or more. Accordingly, the packet analysis device 100 decides that the connection 2 is an abnormal connection, determines that the abnormality level of the connection 2 has increased from "55" to "60", and updates the abnormal connection information for the connection 2.

For example, since the abnormality level of the connection 2 has increased, the packet analysis device 100 updates the abnormality level of the abnormal connection information for the connection 2 to the newly calculated abnormality level "60". For example, since the abnormality level of the connection 2 has increased, the packet analysis device 100 updates the expiration of the abnormal connection information for the connection 2 to the time "10:00:50" that is, 40 seconds after the current point. For example, since the connection 2 is an abnormal connection, the packet analysis device 100 updates the final preservation time of the abnormal connection information for the connection 2 to the time "10:00:50", that is, 40 seconds after the current point. Thereafter, the packet analysis device 100 re-registers the abnormal connection information for the updated connection 2 in association with the abnormality level range "60 to 70" of the abnormality level range list 900.

Next, the time will be 10:00:15. Here, the packet analysis device 100 determines that there is a packet in the packet buffer that has been transferred on connections 1 and 2 at past times 9:59:40 to 9:59:45 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

Moreover, the packet analysis device 100 stores a newly obtained packet of connection 1 in the packet buffer, calculates an abnormality level of connection 1, and then, determines that the abnormality level is the threshold "50" or more. Accordingly, the packet analysis device 100 decides that the connection 1 is an abnormal connection, determines that the abnormality level of the connection 1 has decreased, and updates the abnormal connection information for the connection 1.

For example, since the abnormality level of the connection 1 has decreased, the packet analysis device 100 will not update the abnormality level "80" of the abnormal connection information for the connection 1 and the expiration "10:00:45". For example, since the connection 1 is an abnormal connection, the packet analysis device 100 updates the final preservation time of the abnormal connection information for the connection 1 to the time "10:00:55", that is, 40 seconds after the current point. Thereafter, the packet analysis device 100 re-registers the abnormal connection information for the updated connection 1 in association with the abnormality level range "80 to 90" of the abnormality level range list 900.

Moreover, the packet analysis device 100 stores a newly obtained packet of connection 2 in the packet buffer, calculates an abnormality level of connection 2, and then, determines that the abnormality level is the threshold "50" or more. Accordingly, the packet analysis device 100 decides that the connection 2 is an abnormal connection, determines that the abnormality level of the connection 2 has decreased, and updates the abnormal connection information for the connection 2.

For example, since the abnormality level of the connection 2 has decreased, the packet analysis device 100 will not update the abnormality level "60" of the abnormal connection information for the connection 2 and the expiration "10:00:50". For example, since the connection 2 is an abnormal connection, the packet analysis device 100 updates the final preservation time of the abnormal connection information for the connection 2 to the time "10:00:55", that is, 40 seconds after the current point. Thereafter, the packet analysis device 100 re-registers the abnormal connection information for the updated connection 2 in association with the abnormality level range "60 to 70" of the abnormality level range list 900.

Next, the time will be 10:00:20. Here, the packet analysis device 100 determines that there is a packet in the packet buffer that has been transferred on connections 1 and 2 at past times 9:59:45 to 9:59:50 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

Moreover, the packet analysis device 100 stores a newly obtained packet of connection 1 in the packet buffer, calculates an abnormality level of connection 1, and then, determines that the abnormality level is less than the threshold "50". Accordingly, the packet analysis device 100 decides that the connection 1 is not an abnormal connection.

Moreover, the packet analysis device 100 stores a newly obtained packet of connection 2 in the packet buffer, calculates an abnormality level of connection 2, and then, determines that the abnormality level is less than the threshold "50". Accordingly, the packet analysis device 100 decides that the connection 2 is not an abnormal connection.

Similarly, during time 10:00:25 to 10:00:40, the packet analysis device 100 preferentially stores, in the preservation file, the packet transferred by the connection 1 out of the packets for which 30 seconds have elapsed after acquisition. The packet analysis device 100 decides that the connections 1 and 2 are not abnormal connections.

Next, the time will be 10:00:45. Here, the packet analysis device 100 determines that there is a packet in the packet buffer that has been transferred on connections 1 and 2 at past times 10:00:10 to 10:00:15 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

The packet analysis device 100 detects that the abnormal connection information for the connection 1 has passed expiration. On the basis of the abnormality level history 800, the packet analysis device 100 updates the abnormality level of the abnormal connection information for the connection 1 to the abnormality level "55" of the time "10:00:10" stored in the abnormality level history 800. The details of updating the abnormality level by the packet analysis device 100 on the basis of the abnormality level history 800 will be described below with reference to FIG. 15.

The packet analysis device 100 updates the expiration of the abnormal connection information for the connection 1 to time "10:00:50", that is, 40 seconds after the time "10:00:10" of the abnormality level history 800. The packet analysis device 100 will not update, for example, the final preservation time of the abnormal connection information for the connection 1. Thereafter, the packet analysis device 100 re-registers the abnormal connection information for the updated connection 1 in association with the abnormality level range "50 to 60" of the abnormality level range list 900.

Next, the time will be 10:00:50. Here, the packet analysis device 100 determines that there is a packet in the packet buffer that has been transferred on connections 1 and 2 at past times 10:00:15 to 10:00:20 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 2 in the preservation file.

The packet analysis device 100 detects that the abnormal connection information for the connection 1 has passed expiration. On the basis of the abnormality level history 800, the packet analysis device 100 updates the abnormality level of the abnormal connection information for the connection 1 to the abnormality level "50" of the time "10:00:15" stored in the abnormality level history 800. The details of updating the abnormality level by the packet analysis device 100 on the basis of the abnormality level history 800 will be described below with reference to FIG. 15.

The packet analysis device 100 updates the expiration of the abnormal connection information for the connection 1 to time "10:00:55", that is, 40 seconds after the time "10:00:15" of the abnormality level history 800. The packet analysis device 100 will not update, for example, the final preservation time of the abnormal connection information for the connection 1. Thereafter, the packet analysis device 100 re-registers the abnormal connection information for the updated connection 1 in association with the abnormality level range "50 to 60" of the abnormality level range list 900.

The packet analysis device 100 detects that the abnormal connection information for the connection 2 has passed expiration. On the basis of the abnormality level history 800, the packet analysis device 100 updates the abnormality level of the abnormal connection information for the connection 2 to the abnormality level "55" of the time "10:00:15" stored in the abnormality level history 800. The details of updating the abnormality level by the packet analysis device 100 on the basis of the abnormality level history 800 will be described below with reference to FIG. 15.

The packet analysis device 100 updates the expiration of the abnormal connection information for the connection 2 to time "10:00:55", that is, 40 seconds after the time "10:00:15" of the abnormality level history 800. The packet analysis device 100 will not update, for example, the final preservation time of the abnormal connection information for the connection 2. Thereafter, the packet analysis device 100 re-registers the abnormal connection information for the updated connection 2 in association with the abnormality level range "50 to 60" of the abnormality level range list 900.

Next, the time will be 10:00:55. Here, the packet analysis device 100 determines that there is a packet in the packet buffer that has been transferred on connections 1 and 2 at past times 10:00:20 to 10:00:25 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 2 in the preservation file.

The packet analysis device 100 detects that the abnormal connection information for the connections 1 and 2 has reached the final preservation time. The packet analysis device 100 deletes the abnormal connection information for the connections 1 and 2 registered in association with the abnormality level range of the abnormality level range list 900.

With this configuration, the packet analysis device 100 can preferentially store the packets transferred by the abnormal connection, which is relatively preferable to be stored in the preservation file, out of the packets transferred by the plurality of abnormal connections.

Here, there might be a conceivable case of storing a packet transferred through an abnormal connection having a relatively large abnormality level among the plurality of abnormal connections, every time the abnormality level changes. When this case is applied to the example of FIG. 13, however, the packet transferred by the connection 1 having a relatively large maximum value of the abnormality level might be stored merely for a relatively short period, in some cases. Fortunately however, the packet analysis device 100 can store the packets transferred through the connections 1 and 2 for a certain period of time.

Next, a third operation example of the packet analysis device 100 according to the first example will be described with reference to FIG. 14.

Figure 14:
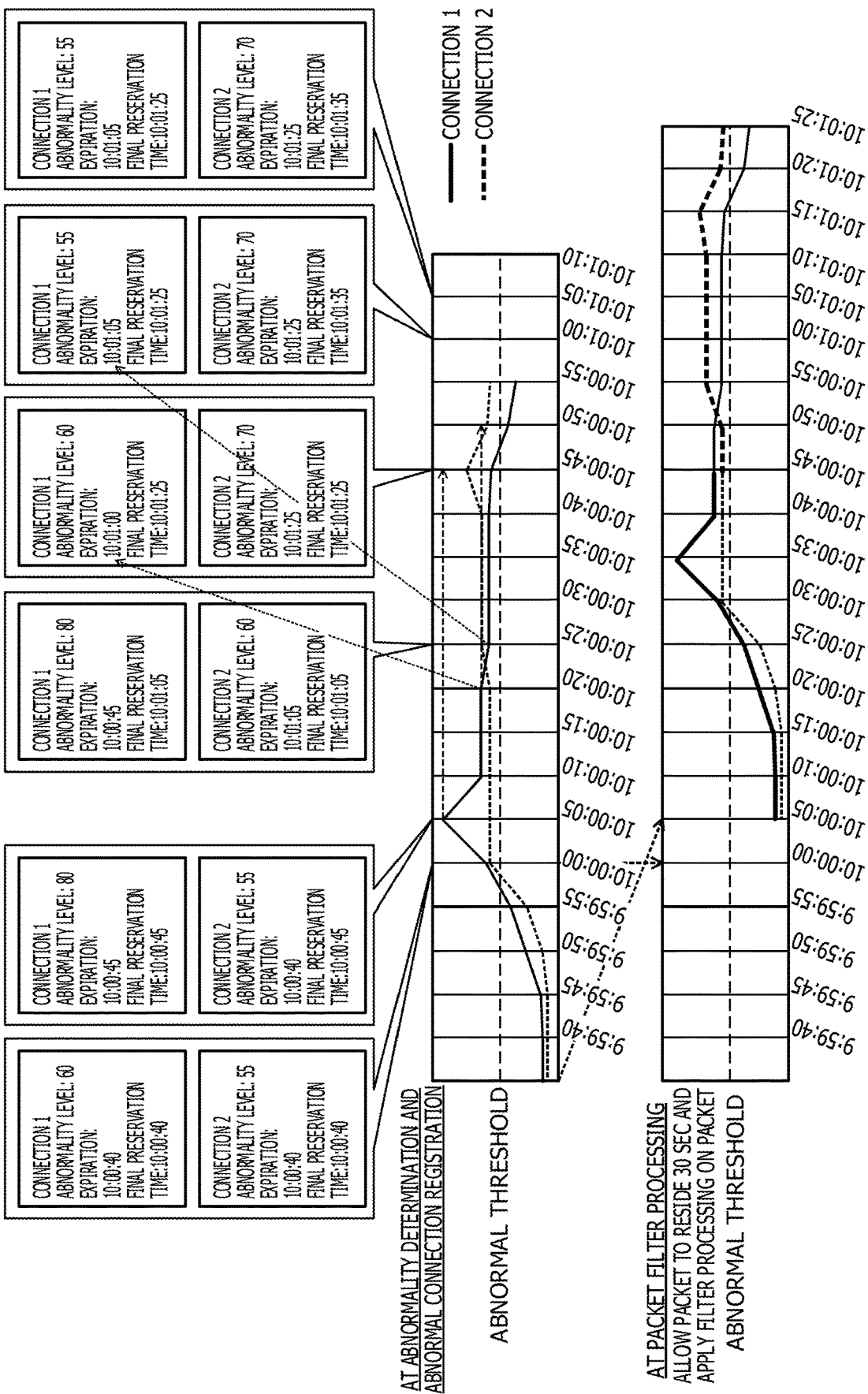
FIG. 14 is a diagram illustrating a third operation example of the packet analysis device 100.

FIG. 14 is a diagram illustrating the third operation example of the packet analysis device 100. For simplification of description, the example of FIG. 14 will describe which of the packets transferred through connection 1 or connection 2 is to be preferentially stored by the packet analysis device 100 at time 9:59:35 to time 10:01:25. The packet analysis device 100 updates the abnormal connection information associated with the abnormality level range list 900 every five seconds.

First, the time is 9:59:35. Here, the packet analysis device 100 stores a newly obtained packet of connection 1 in the packet buffer, calculates an abnormality level of connection 1, and then, determines that the abnormality level is less than the threshold "50". Accordingly, the packet analysis device 100 decides that the connection 1 is not an abnormal connection.

Moreover, the packet analysis device 100 stores a newly obtained packet of connection 2 in the packet buffer, calculates an abnormality level of connection 2, and then, determines that the abnormality level is less than the threshold "50". Accordingly, the packet analysis device 100 decides that the connection 2 is not an abnormal connection.

Similarly, in a time range of 9:59:40 to 9:59:55, the packet analysis device 100 stores newly obtained packets of connections 1 and 2 in the packet buffer, and decides that the connections 1 and 2 are not abnormal connections.

Next, the time will be 10:00:00. Here, the packet analysis device 100 stores the newly obtained packet of the connection 1 in the packet buffer, calculates the abnormality level "60" of the connection 1, and determines that the abnormality level is the threshold "50" or more. Accordingly, the packet analysis device 100 decides that the connection 1 is an abnormal connection, and generates abnormal connection information for the connection 1.

For example, the packet analysis device 100 generates abnormal connection information including calculated abnormality level "60", the time "10:00:40", that is, 40 seconds after the current point as the expiration, and the time "10:00:40" that is, 40 seconds after the current point as the final preservation time. Thereafter, the packet analysis device 100 registers the abnormal connection information for the generated connection 1 in association with the abnormality level range "60 to 70" of the abnormality level range list 900.

Moreover, the packet analysis device 100 stores a newly obtained packet of connection 2 in the packet buffer, calculates an abnormality level "55" of connection 2, and then, determines that the abnormality level is the threshold "50" or more. Accordingly, the packet analysis device 100 decides that the connection 2 is an abnormal connection, and generates abnormal connection information for the connection 2.

For example, the packet analysis device 100 generates abnormal connection information including calculated abnormality level "55", the time "10:00:40", that is, 40 seconds after the current point as the expiration, and the time "10:00:40", that is, 40 seconds after the current point as the final preservation time. Thereafter, the packet analysis device 100 registers the abnormal connection information for the generated connection 2 in association with the abnormality level range "50 to 60" of the abnormality level range list 900.

Next, the time will be 10:00:05. Here, the packet analysis device 100 stores a newly obtained packet of connection 1 in the packet buffer, calculates an abnormality level "80" of connection 1, and then, determines that the abnormality level is the threshold "50" or more. Accordingly, the packet analysis device 100 decides that the connection 1 is an abnormal connection, determines that the abnormality level of the connection 1 has increased from "60" to "80", and updates the abnormal connection information for the connection 1.

For example, since the abnormality level of the connection 1 has increased, the packet analysis device 100 updates the abnormality level of the abnormal connection information for the connection 1 to the newly calculated abnormality level "80". For example, since the abnormality level of the connection 1 has increased, the packet analysis device 100 updates the expiration of the abnormal connection information for the connection 1 to the time "10:00:45", that is, 40 seconds after the current point. For example, since the connection 1 is an abnormal connection, the packet analysis device 100 updates the final preservation time of the abnormal connection information for the connection 1 to the time "10:00:45", that is, 40 seconds after the current point. Thereafter, the packet analysis device 100 re-registers the abnormal connection information for the updated connection 1 in association with the abnormality level range "80 to 90" of the abnormality level range list 900.

Moreover, the packet analysis device 100 stores a newly obtained packet of connection 2 in the packet buffer, calculates an abnormality level "55" of connection 2, and then, determines that the abnormality level is the threshold "50" or more. Accordingly, the packet analysis device 100 decides that the connection 2 is an abnormal connection, determines that the abnormality level of the connection 2 has not changed, and updates the abnormal connection information for the connection 2.

For example, since the abnormality level of the connection 2 has not changed, the packet analysis device 100 will not update the abnormality level "55" of the abnormal connection information for the connection 2 and the expiration "10:00:40". For example, since the connection 2 is an abnormal connection, the packet analysis device 100 updates the final preservation time of the abnormal connection information for the connection 2 to the time "10:00:45", that is, 40 seconds after the current point. Thereafter, the packet analysis device 100 re-registers the abnormal connection information for the updated connection 2 in association with the abnormality level range "50 to 60" of the abnormality level range list 900.

Next, the time will be 10:00:10. Here, the packet analysis device 100 determines that there is a packet in the packet buffer that has been transferred on connections 1 and 2 at past times 9:59:35 to 9:59:40 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

Moreover, the packet analysis device 100 stores a newly obtained packet of connection 1 in the packet buffer, calculates an abnormality level of connection 1, and then, determines that the abnormality level is the threshold "50" or more. Accordingly, the packet analysis device 100 decides that the connection 1 is an abnormal connection, determines that the abnormality level of the connection 1 has decreased, and updates the abnormal connection information for the connection 1.

For example, since the abnormality level of the connection 1 has decreased, the packet analysis device 100 will not update the abnormality level "80" of the abnormal connection information for the connection 1 and the expiration "10:00:45". For example, since the connection 1 is an abnormal connection, the packet analysis device 100 updates the final preservation time of the abnormal connection information for the connection 1 to the time "10:00:50", that is, 40 seconds after the current point. Thereafter, the packet analysis device 100 re-registers the abnormal connection information for the updated connection 1 in association with the abnormality level range "80 to 90" of the abnormality level range list 900.

Moreover, the packet analysis device 100 stores a newly obtained packet of connection 2 in the packet buffer, calculates an abnormality level "55" of connection 2, and then, determines that the abnormality level is the threshold "50" or more. Accordingly, the packet analysis device 100 decides that the connection 2 is an abnormal connection, determines that the abnormality level of the connection 2 has not changed, and updates the abnormal connection information for the connection 2.

For example, since the abnormality level of the connection 2 has not changed, the packet analysis device 100 will not update the abnormality level "55" of the abnormal connection information for the connection 2 and the expiration "10:00:40". For example, since the connection 2 is an abnormal connection, the packet analysis device 100 updates the final preservation time of the abnormal connection information for the connection 2 to the time "10:00:50", that is, 40 seconds after the current point. Thereafter, the packet analysis device 100 re-registers the abnormal connection information for the updated connection 2 in association with the abnormality level range "50 to 60" of the abnormality level range list 900.

Next, the time will be 10:00:15. Here, the packet analysis device 100 determines that there is a packet in the packet buffer that has been transferred on connections 1 and 2 at past times 9:59:40 to 9:59:45 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

Moreover, the packet analysis device 100 stores a newly obtained packet of connection 1 in the packet buffer, calculates an abnormality level "60" of connection 1, and then, determines that the abnormality level is the threshold "50" or more. Accordingly, the packet analysis device 100 decides that the connection 1 is an abnormal connection, determines that the abnormality level of the connection 1 has not changed, and updates the abnormal connection information for the connection 1.

For example, since the abnormality level of the connection 1 has not changed, the packet analysis device 100 will not update the abnormality level "80" of the abnormal connection information for the connection 1 and the expiration "10:00:45". For example, since the connection 1 is an abnormal connection, the packet analysis device 100 updates the final preservation time of the abnormal connection information for the connection 1 to the time "10:00:55", that is, 40 seconds after the current point. Thereafter, the packet analysis device 100 re-registers the abnormal connection information for the updated connection 1 in association with the abnormality level range "60 to 70" of the abnormality level range list 900.

Moreover, the packet analysis device 100 stores a newly obtained packet of connection 2 in the packet buffer, calculates an abnormality level "55" of connection 2, and then, determines that the abnormality level is the threshold "50" or more. Accordingly, the packet analysis device 100 decides that the connection 2 is an abnormal connection, determines that the abnormality level of the connection 2 has not changed, and updates the abnormal connection information for the connection 2.

For example, since the abnormality level of the connection 2 has not changed, the packet analysis device 100 will not update the abnormality level "55" of the abnormal connection information for the connection 2 and the expiration "10:00:40". For example, since the connection 2 is an abnormal connection, the packet analysis device 100 updates the final preservation time of the abnormal connection information for the connection 2 to the time "10:00:55", that is, 40 seconds after the current point. Thereafter, the packet analysis device 100 re-registers the abnormal connection information for the updated connection 2 in association with the abnormality level range "50 to 60" of the abnormality level range list 900.

Next, the time will be 10:00:20. Here, the packet analysis device 100 determines that there is a packet in the packet buffer that has been transferred on connections 1 and 2 at past times 9:59:45 to 9:59:50 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

Moreover, the packet analysis device 100 stores a newly obtained packet of connection 1 in the packet buffer, calculates an abnormality level "60" of connection 1, and then, determines that the abnormality level is the threshold "50" or more. Accordingly, the packet analysis device 100 decides that the connection 1 is an abnormal connection, determines that the abnormality level of the connection 1 has not changed, and updates the abnormal connection information for the connection 1.

For example, since the abnormality level of the connection 1 has not changed, the packet analysis device 100 will not update the abnormality level "80" of the abnormal connection information for the connection 1 and the expiration "10:00:45". For example, since the connection 1 is an abnormal connection, the packet analysis device 100 updates the final preservation time of the abnormal connection information for the connection 1 to the time "10:00:55", that is, 40 seconds after the current point. Thereafter, the packet analysis device 100 re-registers the abnormal connection information for the updated connection 1 in association with the abnormality level range "60 to 70" of the abnormality level range list 900.

Moreover, the packet analysis device 100 stores a newly obtained packet of connection 2 in the packet buffer, calculates an abnormality level "55" of connection 2, and then, determines that the abnormality level is the threshold "50" or more. Accordingly, the packet analysis device 100 decides that the connection 2 is an abnormal connection, determines that the abnormality level of the connection 2 has not changed, and updates the abnormal connection information for the connection 2.

For example, since the abnormality level of the connection 2 has not changed, the packet analysis device 100 will not update the abnormality level "55" of the abnormal connection information for the connection 2 and the expiration "10:00:40". For example, since the connection 2 is an abnormal connection, the packet analysis device 100 updates the final preservation time of the abnormal connection information for the connection 2 to the time "10:00:55", that is, 40 seconds after the current point. Thereafter, the packet analysis device 100 re-registers the abnormal connection information for the updated connection 2 in association with the abnormality level range "50 to 60" of the abnormality level range list 900.

Next, the time will be 10:00:25. Here, the packet analysis device 100 determines that there is a packet in the packet buffer that has been transferred on connections 1 and 2 at past times 9:59:50 to 9:59:55 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

Moreover, Here, the packet analysis device 100 stores a newly obtained packet of connection 1 in the packet buffer, calculates an abnormality level "55" of connection 1, and then, determines that the abnormality level is the threshold "50" or more. Accordingly, the packet analysis device 100 decides that the connection 1 is an abnormal connection, determines that the abnormality level of the connection 1 has decreased, and updates the abnormal connection information for the connection 1.

For example, since the abnormality level of the connection 1 has decreased, the packet analysis device 100 will not update the abnormality level "80" of the abnormal connection information for the connection 1 and the expiration "10:00:45". For example, since the connection 1 is an abnormal connection, the packet analysis device 100 updates the final preservation time of the abnormal connection information for the connection 1 to the time "10:01:05", that is, 40 seconds after the current point. Thereafter, the packet analysis device 100 re-registers the abnormal connection information for the updated connection 1 in association with the abnormality level range "80 to 90" of the abnormality level range list 900.

Moreover, the packet analysis device 100 stores a newly obtained packet of connection 2 in the packet buffer, calculates an abnormality level "60" of connection 2, and then, determines that the abnormality level is the threshold "50" or more. Accordingly, the packet analysis device 100 decides that the connection 2 is an abnormal connection, determines that the abnormality level of the connection 2 has increased, and updates the abnormal connection information for the connection 2.

For example, since the abnormality level of the connection 2 has increased, the packet analysis device 100 updates the abnormality level of the abnormal connection information for the connection 2 to the newly calculated abnormality level "60". For example, since the abnormality level of the connection 2 has increased, the packet analysis device 100 updates the expiration of the abnormal connection information for the connection 2 to the time "10:01:05", that is, 40 seconds after the current point. For example, since the connection 2 is an abnormal connection, the packet analysis device 100 updates the final preservation time of the abnormal connection information for the connection 2 to the time "10:01:05", that is, 40 seconds after the current point. Thereafter, the packet analysis device 100 re-registers the abnormal connection information for the updated connection 2 in association with the abnormality level range "60 to 70" of the abnormality level range list 900.

Next, the time will be 10:00:30. Here, the packet analysis device 100 determines that there is a packet in the packet buffer that has been transferred on connections 1 and 2 at past times 9:59:55 to 10:00:00 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

Moreover, Here, the packet analysis device 100 stores a newly obtained packet of connection 1 in the packet buffer, calculates an abnormality level "55" of connection 1, and then, determines that the abnormality level is the threshold "50" or more. Accordingly, the packet analysis device 100 decides that the connection 1 is an abnormal connection, determines that the abnormality level of the connection 1 has not changed, and updates the abnormal connection information for the connection 1.

For example, since the abnormality level of the connection 1 has not changed, the packet analysis device 100 will not update the abnormality level "80" of the abnormal connection information for the connection 1 and the expiration "10:00:45". For example, since the connection 1 is an abnormal connection, the packet analysis device 100 updates the final preservation time of the abnormal connection information for the connection 1 to the time "10:01:10", that is, 40 seconds after the current point. Thereafter, the packet analysis device 100 re-registers the abnormal connection information for the updated connection 1 in association with the abnormality level range "50 to 60" of the abnormality level range list 900.

Moreover, the packet analysis device 100 stores a newly obtained packet of connection 2 in the packet buffer, calculates an abnormality level "60" of connection 2, and then, determines that the abnormality level is the threshold "50" or more. Accordingly, the packet analysis device 100 decides that the connection 2 is an abnormal connection, determines that the abnormality level of the connection 2 has not changed, and updates the abnormal connection information for the connection 2.

For example, since the abnormality level of the connection 2 has not changed, the packet analysis device 100 will not update the abnormality level "60" of the abnormal connection information for the connection 2 and the expiration "10:01:05". For example, since the connection 2 is an abnormal connection, the packet analysis device 100 updates the final preservation time of the abnormal connection information for the connection 2 to the time "10:01:10", that is, 40 seconds after the current point. Thereafter, the packet analysis device 100 re-registers the abnormal connection information for the updated connection 2 in association with the abnormality level range "60 to 70" of the abnormality level range list 900.

Similarly, during time 10:00:35 to 10:00:40, the packet analysis device 100 preferentially stores, in the preservation file, the packet transferred by the connection 1 out of the packets for which 30 seconds have elapsed after acquisition. Moreover, the packet analysis device 100 decides that connections 1 and 2 are abnormal connections, determines that the abnormality levels of the connections 1 and 2 have not changed, and updates the final preservation time of the abnormal connection information for the connection 1. Thereafter, the packet analysis device 100 re-registers the abnormal connection information for the updated connection 1.

Next, the time will be 10:00:45. Here, the packet analysis device 100 determines that there is a packet in the packet buffer that has been transferred on connections 1 and 2 at past times 10:00:10 to 10:00:15 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 1 in the preservation file.

The packet analysis device 100 detects that the abnormal connection information for the connection 1 has passed expiration. On the basis of the abnormality level history 800, the packet analysis device 100 updates the abnormality level of the abnormal connection information for the connection 1 to the abnormality level "60" of the time "10:00:20" stored in the abnormality level history 800. The details of updating the abnormality level by the packet analysis device 100 on the basis of the abnormality level history 800 will be described below with reference to FIG. 15.

The packet analysis device 100 updates the expiration of the abnormal connection information for the connection 1 to time "10:01:00", that is, 40 seconds after the time "10:00:20" of the abnormality level history 800. The packet analysis device 100 will not update, for example, the final preservation time of the abnormal connection information for the connection 1. Thereafter, the packet analysis device 100 re-registers the abnormal connection information for the updated connection 1 in association with the abnormality level range "60 to 70" of the abnormality level range list 900.

Moreover, the packet analysis device 100 stores a newly obtained packet of connection 2 in the packet buffer, calculates an abnormality level "70" of connection 2, and then, determines that the abnormality level is the threshold "50" or more. Accordingly, the packet analysis device 100 decides that the connection 2 is an abnormal connection, determines that the abnormality level of the connection 2 has increased, and updates the abnormal connection information for the connection 2.

For example, since the abnormality level of the connection 2 has increased, the packet analysis device 100 updates the abnormality level of the abnormal connection information for the connection 2 to the newly calculated abnormality level "70". For example, since the abnormality level of the connection 2 has increased, the packet analysis device 100 updates the expiration of the abnormal connection information for the connection 2 to the time "10:01:25", that is, 40 seconds after the current point. For example, since the connection 2 is an abnormal connection, the packet analysis device 100 updates the final preservation time of the abnormal connection information for the connection 2 to the time "10:01:25", that is, 40 seconds after the current point. Thereafter, the packet analysis device 100 re-registers the abnormal connection information for the updated connection 2 in association with the abnormality level range "70 to 80" of the abnormality level range list 900.

Next, the time will be 10:00:50. Here, the packet analysis device 100 determines that there is a packet in the packet buffer that has been transferred on connections 1 and 2 at past times 10:00:15 to 10:00:20 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 2 in the preservation file.

Moreover, the packet analysis device 100 stores a newly obtained packet of connection 1 in the packet buffer, calculates an abnormality level of connection 1, and then, determines that the abnormality level is less than the threshold "50". Accordingly, the packet analysis device 100 decides that the connection 1 is not an abnormal connection.

Moreover, the packet analysis device 100 stores a newly obtained packet of connection 2 in the packet buffer, calculates an abnormality level of connection 2, and then, determines that the abnormality level is the threshold "50" or more. Accordingly, the packet analysis device 100 decides that the connection 2 is an abnormal connection, determines that the abnormality level of the connection 2 has decreased, and updates the abnormal connection information for the connection 2.

For example, since the abnormality level of the connection 2 has decreased, the packet analysis device 100 will not update the abnormality level "70" of the abnormal connection information for the connection 2 and the expiration "10:01:25". For example, since the connection 2 is an abnormal connection, the packet analysis device 100 updates the final preservation time of the abnormal connection information for the connection 2 to the time "10:01:30", that is, 40 seconds after the current point. Thereafter, the packet analysis device 100 re-registers the abnormal connection information for the updated connection 2 in association with the abnormality level range "70 to 80" of the abnormality level range list 900.

Similarly, at time 10:00:55, the packet analysis device 100 preferentially stores, in the preservation file, the packet transferred by the connection 2 out of the packets for which 30 seconds have elapsed after acquisition. The packet analysis device 100 decides that the connection 1 is not abnormal connection. Moreover, the packet analysis device 100 decides the connection 2 to be an abnormal connection, determines that the abnormality level of the connection 2 has decreased, and updates the final preservation time of the abnormal connection information for the connection 2 to "10:01:35", that is, 40 seconds after the current point. Thereafter, the packet analysis device 100 re-registers the abnormal connection information for the updated connection 2.

Next, the time will be 10:01:00. Here, the packet analysis device 100 determines that there is a packet in the packet buffer that has been transferred on connections 1 and 2 at past times 10:00:25 to 10:00:30 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 2 in the preservation file.

The packet analysis device 100 detects that the abnormal connection information for the connection 1 has passed expiration. On the basis of the abnormality level history 800, the packet analysis device 100 updates the abnormality level of the abnormal connection information for the connection 1 to the abnormality level "55" of the time "10:00:25" stored in the abnormality level history 800. The details of updating the abnormality level by the packet analysis device 100 on the basis of the abnormality level history 800 will be described below with reference to FIG. 15.

The packet analysis device 100 updates the expiration of the abnormal connection information for the connection 1 to time "10:01:05", that is, 40 seconds after the time "10:00:25" of the abnormality level history 800. The packet analysis device 100 will not update, for example, the final preservation time of the abnormal connection information for the connection 1. Thereafter, the packet analysis device 100 re-registers the abnormal connection information for the updated connection 1 in association with the abnormality level range "50 to 60" of the abnormality level range list 900.

Next, the time will be 10:01:05. Here, the packet analysis device 100 determines that there is a packet in the packet buffer that has been transferred on connections 1 and 2 at past times 10:00:30 to 10:00:35 and for which 30 seconds have elapsed since acquisition. Thereafter, the packet analysis device 100 preferentially stores, in the preservation file, the packet transferred by the abnormal connection associated with the relatively large abnormality level range out of the packets for which 30 seconds have elapsed since acquisition. The packet analysis device 100 preferentially stores the packet transferred through the connection 2 in the preservation file.

The packet analysis device 100 detects that the abnormal connection information for the connection 1 has passed expiration. On the basis of the abnormality level history 800, the packet analysis device 100 updates the abnormality level of the abnormal connection information for the connection 1 to the abnormality level "55" of the time "10:00:25" stored in the abnormality level history 800. The details of updating the abnormality level by the packet analysis device 100 on the basis of the abnormality level history 800 will be described below with reference to FIG. 15.

The packet analysis device 100 updates the expiration of the abnormal connection information for the connection 1 to time "10:01:05", that is, 40 seconds after the time "10:00:25" of the abnormality level history 800. The packet analysis device 100 will not update, for example, the final preservation time of the abnormal connection information for the connection 1. Thereafter, the packet analysis device 100 re-registers the abnormal connection information for the updated connection 1 in association with the abnormality level range "50 to 60" of the abnormality level range list 900.

Next, during time 10:01:10 to 10:01:25, the packet analysis device 100 preferentially stores, in the preservation file, the packet transferred by the connection 2 out of the packets for which 30 seconds have elapsed after acquisition.

With this configuration, the packet analysis device 100 can preferentially store the packets transferred by the abnormal connection, which is relatively preferable to be stored in the preservation file, out of the packets transferred by the plurality of abnormal connections.

Here, there might be a conceivable case of deciding a target packet to be stored in terms of which connection has been used to transfer the packet on the basis of the maximum value of the abnormality level up to the current point, among the plurality of abnormal connections. When this case is applied to the example of FIG. 14, however, the packet transferred by the connection 2 having a small maximum value of the abnormality level might not be stored in the preservation file. Fortunately, however, the packet analysis device 100 can store the packets transferred individually by the connections 1 and 2.

Next, an example of the setting of the abnormality level based on the abnormality level history 800 will be described with reference to FIG. 15.

Figure 15:
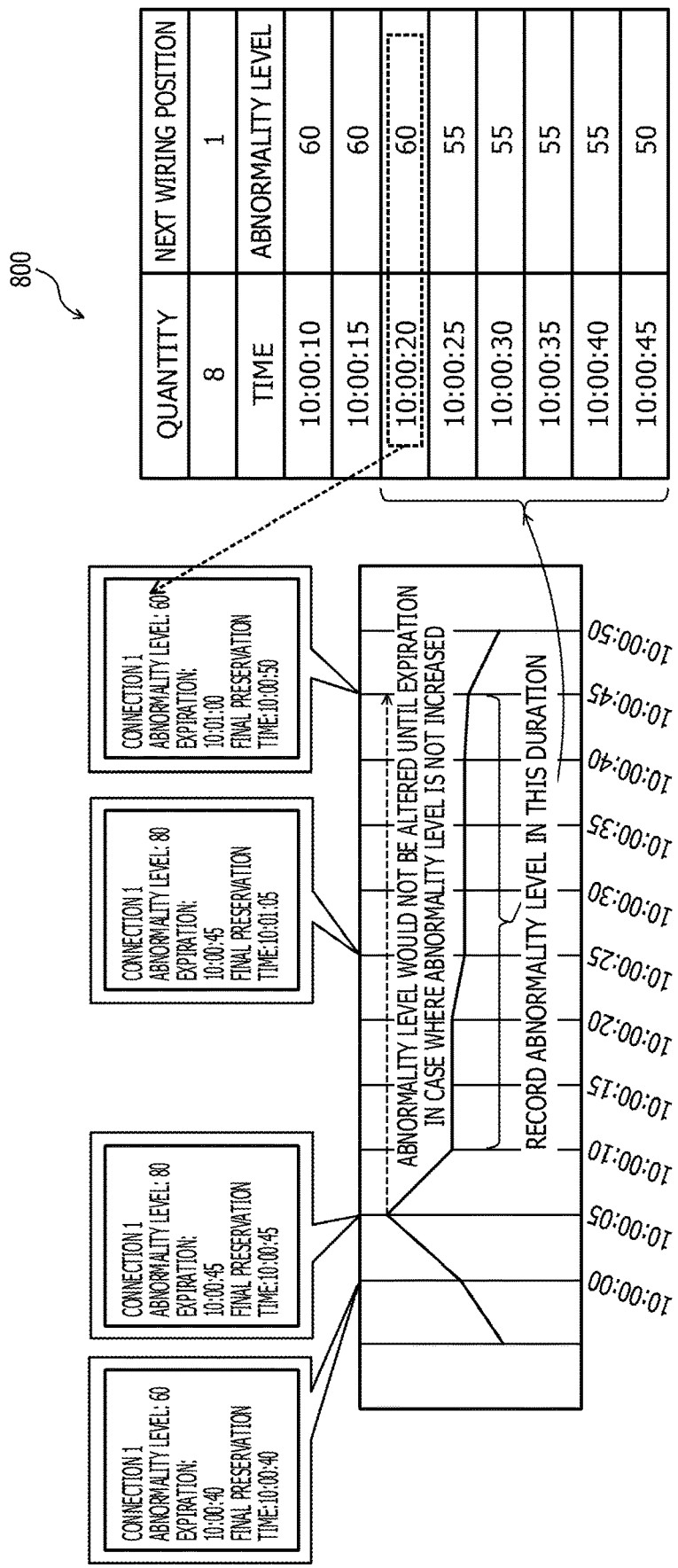
FIG. 15 is a diagram illustrating an example of abnormality level setting based on the abnormality level history 800.

FIG. 15 is a diagram illustrating an example of abnormality level setting based on the abnormality level history 800. As illustrated in FIG. 15, the packet analysis device 100 preliminarily stores a predetermined number of abnormality levels calculated in the past in the abnormality level history 800. Thereafter, at setting the abnormality level based on the abnormality level history 800, the packet analysis device 100 sets the maximum value among the abnormality levels stored in the abnormality level history 800 as a new abnormality level.

For example, after time 9:59:55, the packet analysis device 100 calculates an abnormality level every five seconds, and stores the abnormality level in the abnormality level history 800. In a case where there are eight abnormality levels in the abnormality level history 800, the packet analysis device 100 overwrites the oldest abnormality level with the newly calculated abnormality level and stores the latest eight abnormality levels.

For example, when setting the abnormality level based on the abnormality level history 800 at time 10:00:45, the packet analysis device 100 sets the maximum value "60" out of the plurality of abnormality levels for the time 10:00:10 to 10:00:45 stored in the abnormality level history 800. In a case where a plurality of maximum values exists, the packet analysis device 100 uses the most recently stored maximum value among the plurality of maximum values. In a case where the packet analysis device 100 has set the maximum value, the packet analysis device 100 updates the expiration on the basis of the time of calculation of the maximum value.

With this configuration, the packet analysis device 100 can improve the possibility of being able to use the abnormality level which is to be preferably used in registration of abnormal connection information, as compared with the case of using an abnormality level at the current time alone. This would make it easy for the packet analysis device 100 to further effectively extract packets transferred through the abnormal connection, which is to be preferably stored in the preservation file.

(Example of Storage Processing Procedure in First Example)

Next, an example of a storage processing procedure executed by the packet analysis device 100 according to the first example will be described with reference to FIG. 16.

Figure 16:
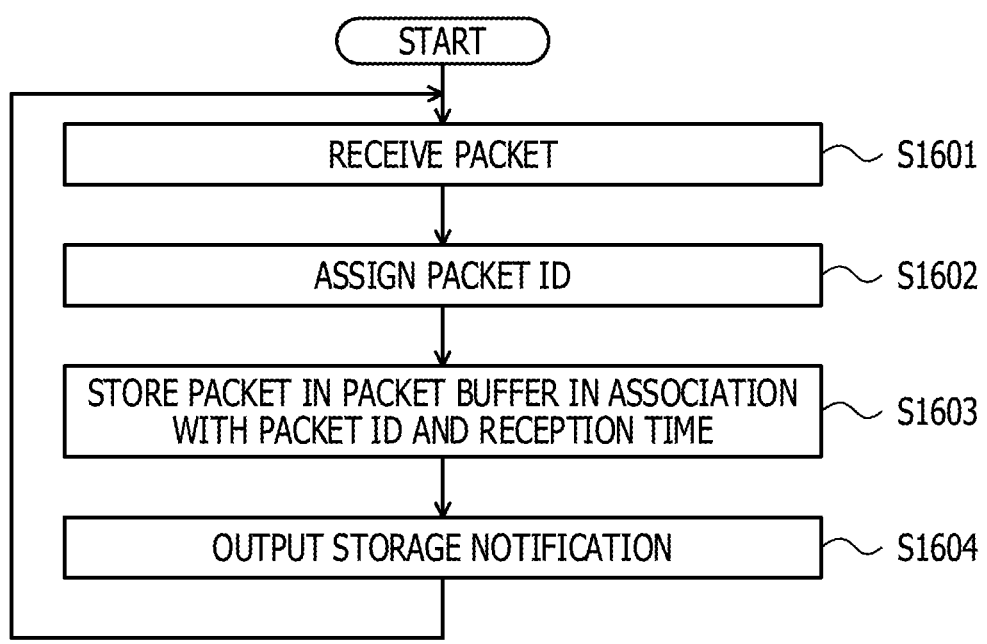
FIG. 16 is a flowchart illustrating an example of a storage processing procedure according to a first example.

FIG. 16 is a flowchart illustrating an example of a storage processing procedure according to the first example. In FIG. 16, the packet analysis device 100 receives a packet using mirroring (step S1601). Next, the packet analysis device 100 assigns a packet ID to the received packet (step S1602). Subsequently, the packet analysis device 100 stores the received packet in the packet buffer in association with the assigned packet ID, and the reception time (step S1603).

Next, the packet analysis device 100 outputs a storage notification about the received packet (step S1604). Now, the packet analysis device 100 finishes the storage processing. With this procedure, the packet analysis device 100 can temporarily accumulate the received packet in the packet buffer.

(Example of Analysis Processing Procedure in First Example)

Next, an example of an analysis processing procedure executed by the packet analysis device 100 according to the first example will be described with reference to FIG. 17.

Figure 17:
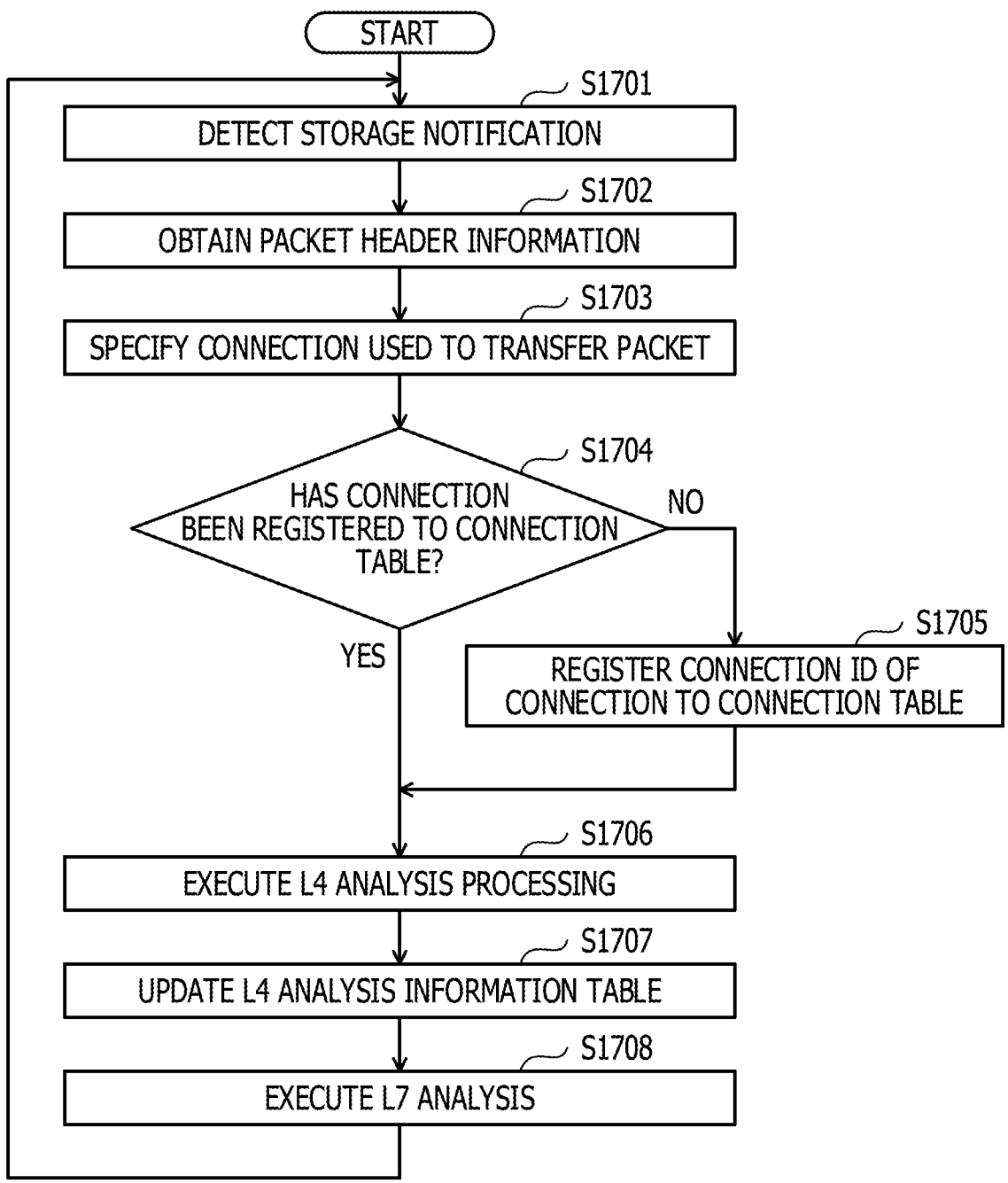
FIG. 17 is a flowchart illustrating an example of an analysis processing procedure according to the first example.

FIG. 17 is a flowchart illustrating an example of the analysis processing procedure according to the first example. In FIG. 17, the packet analysis device 100 detects a storage notification (step S1701). Next, the packet analysis device 100 obtains header information of the packet stored in the packet buffer (step S1702). Subsequently, the packet analysis device 100 specifies the connection used to transfer the packet (step S1703).

Next, the packet analysis device 100 determines whether the connection ID of the specified connection is already registered in the connection table 400 (step S1704). Here, in a case where the connection ID has been registered (step S1704: Yes), the packet analysis device 100 proceeds to the processing of step S1706.

In contrast, in a case where the connection ID has not been registered (step S1704: No), the packet analysis device 100 registers the connection ID of the specified connection in the connection table 400 (step S1705). Subsequently, the packet analysis device 100 proceeds to the processing of step S1706.

In step S1706, the packet analysis device 100 executes L4 analysis processing for the specified connection (step S1706). Next, the packet analysis device 100 refers to an analysis result of the L4 analysis processing and updates the L4 analysis information table 600 (step S1707).

Subsequently, the packet analysis device 100 executes L7 analysis (step S1708), and returns to the processing of step S1701.

(Example of Abnormality Determination Processing Procedure in First Example)

Next, an example of abnormality determination processing procedure executed by the packet analysis device 100 according to the first example will be described with reference to FIG. 18.

Figure 18:
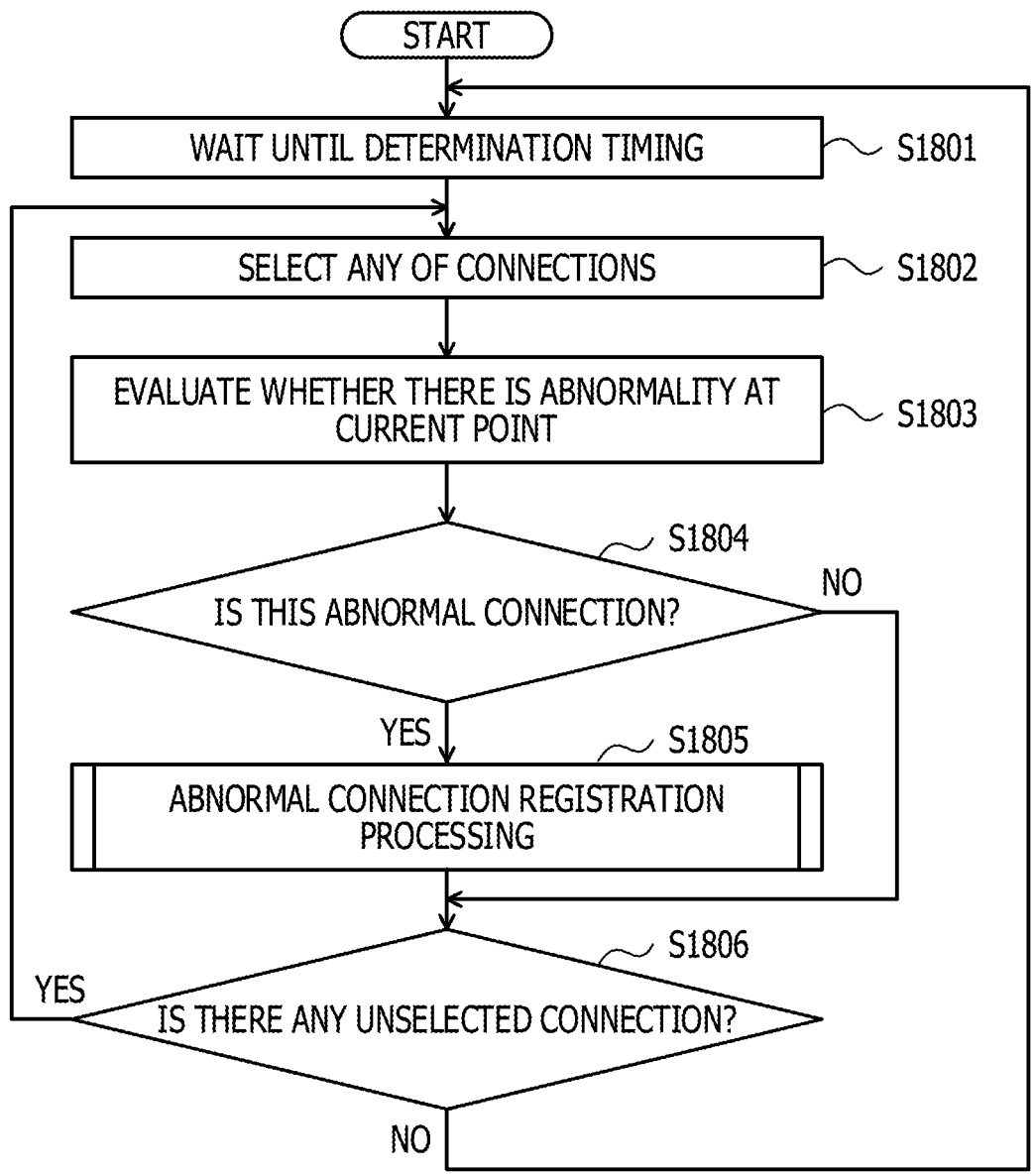
FIG. 18 is a flowchart illustrating an example of an abnormality determination processing procedure according to the first example.

FIG. 18 is a flowchart illustrating an example of an abnormality determination processing procedure according to the first example. In FIG. 18, the packet analysis device 100 waits until determination timings at predetermined time intervals (step S1801). Next, at the determination timing, the packet analysis device 100 refers to the connection table 400 and selects one of the connections (step S1802). Subsequently, the packet analysis device 100 refers to the L4 analysis information table 600, and evaluates whether there is an abnormality in the selected connection at the current point (step S1803).

Thereafter, the packet analysis device 100 refers to the evaluation result and the abnormal connection information table 700 and determines whether the selected connection is an abnormal connection (step S1804). Here, in a case where the connection is not an abnormal connection (step S1804: No), the packet analysis device 100 proceeds to the processing of step S1806.

In contrast, in a case where the connection is an abnormal connection (step S1804: Yes), the packet analysis device 100 executes abnormal connection registration processing described below with reference to FIG. 19 (step S1805). Subsequently, the packet analysis device 100 proceeds to the processing of step S1806.

In step S1806, the packet analysis device 100 refers to the connection table 400 and determines whether there is an unselected connection (step S1806). Here, in a case where there is an unselected connection (step S1806: Yes), the packet analysis device 100 returns to the processing of step S1802.

In contrast, in a case where there is no unselected connection (step S1806: No), the packet analysis device 100 finishes the abnormality determination processing.

(Example of Abnormal Connection Registration Processing Procedure in First Example)

Next, an example of the abnormal connection registration processing procedure executed by the packet analysis device 100 according to the first example will be described with reference to FIG. 19.

Figure 19:
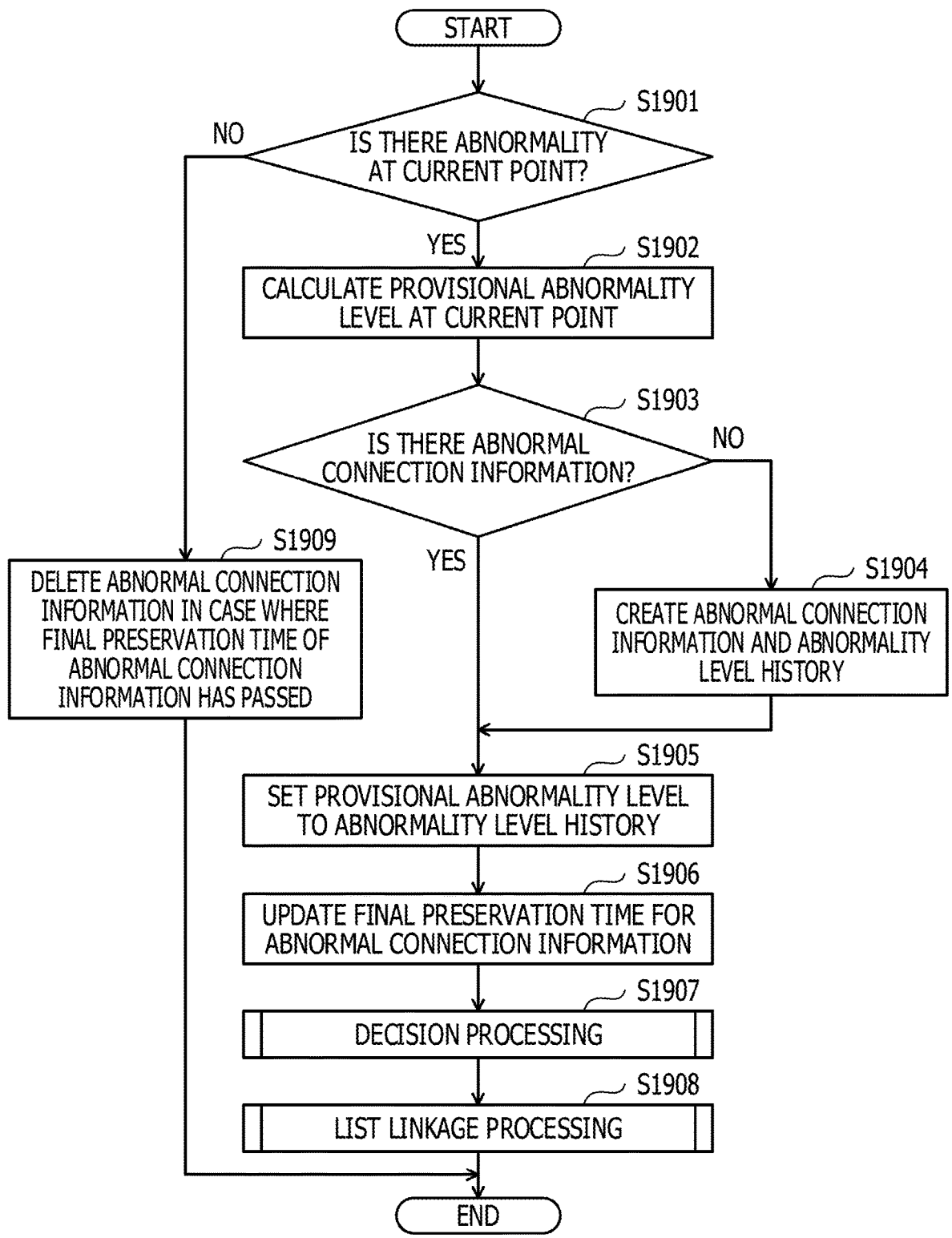
FIG. 19 is a flowchart illustrating an example of an abnormal connection registration processing procedure according to the first example.

FIG. 19 is a flowchart illustrating an example of the abnormal connection registration processing procedure according to the first example. In FIG. 19, the packet analysis device 100 determines whether there is an abnormality in the abnormal connection at the current point (step S1901). Here, in a case where there is an abnormality at the current point (step S1901: Yes), the packet analysis device 100 calculates a provisional abnormality level at the current point of the abnormal connection (step S1902).

Next, the packet analysis device 100 refers to the abnormal connection information table 700 and determines whether there is abnormal connection information for the abnormal connection (step S1903). Here, in a case where there is abnormal connection information (step S1903: Yes), the packet analysis device 100 proceeds to the processing of step S1905.

In contrast, in a case where there is no abnormal connection information (step S1903: No), the packet analysis device 100 creates abnormal connection information and an abnormality level history 800 for the abnormal connection (step S1904). Subsequently, the packet analysis device 100 proceeds to the processing of step S1905.

In step S1905, the packet analysis device 100 sets the calculated provisional abnormality level in the abnormality level history 800 for the abnormal connection (step S1905). Next, the packet analysis device 100 updates the final preservation time of the abnormal connection information for the abnormal connection (step S1906). Subsequently, the packet analysis device 100 executes decision processing described below with reference to FIG. 20 (step S1907).

Next, the packet analysis device 100 executes list linkage processing described below with reference to FIG. 21 (step S1908). Now, the packet analysis device 100 finishes the abnormal connection registration processing.

In contrast, in a case where there is no abnormality at the current point in step S1901 (step S1901: No), the packet analysis device 100 deletes the abnormal connection information in a case where the time is past the final preservation time of the abnormal connection information for the abnormal connection (step S1909). Now, the packet analysis device 100 finishes the abnormal connection registration processing.

(Example of Decision Processing Procedure in First Example)

Next, an example of the decision processing procedure executed by the packet analysis device 100 according to the first example will be described with reference to FIG. 20.

Figure 20:
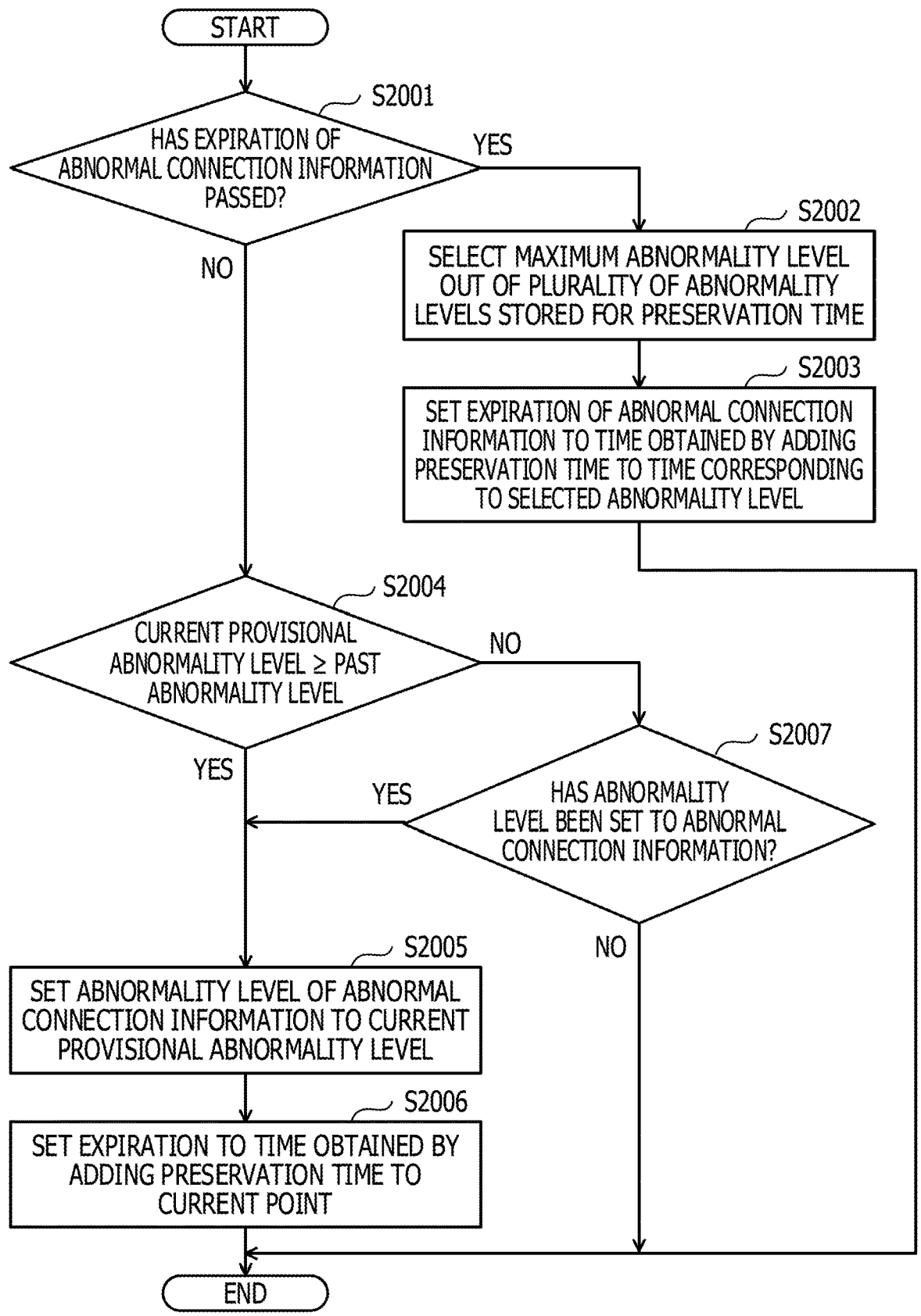
FIG. 20 is a flowchart illustrating an example of a decision processing procedure according to the first example.

FIG. 20 is a flowchart illustrating an example of the decision processing procedure according to the first example. In FIG. 20, the packet analysis device 100 determines whether the expiration of the abnormal connection information for the abnormal connection has passed (step S2001). Here, in a case where the expiration has passed (step S2001: Yes), the packet analysis device 100 refers to the abnormality level history 800 and selects the maximum abnormality level among the plurality of abnormality levels stored for the preservation time (step S2002).

Next, the packet analysis device 100 sets the expiration of the abnormal connection information for the abnormal connection to a time obtained by adding the preservation time to the time corresponding to the selected abnormality level (step S2003). Subsequently, the packet analysis device 100 ends the decision processing.

In contrast, in a case where the expiration has not passed (step S2001: No), the packet analysis device 100 determines whether the current provisional abnormality level≥past abnormality level (step S2004). Here, in a case where the present provisional abnormality level≥past abnormality level (step S2004: Yes), the packet analysis device 100 sets the abnormality level of the abnormal connection information for the abnormal connection to the current provisional abnormality level (step S2005).

Next, the packet analysis device 100 sets the expiration to a time obtained by adding the preservation time to the current point (step S2006). Subsequently, the packet analysis device 100 ends the decision processing.

In contrast, in a case where the relationship of the current provisional abnormality level≥past abnormality level is not satisfied in step S2004 (step S2004: No), the packet analysis device 100 determines whether an abnormality level is already set to abnormal connection information. (step S2007). Here, in a case where the setting has been made (step S2007: Yes), the packet analysis device 100 finishes the decision processing.

In contrast, in a case where the setting has not been made (step S2007: No), the packet analysis device 100 proceeds to the processing of step S2006.

(Example of List Linkage Processing Procedure in First Example)

Next, an example of a list linkage processing procedure performed by the packet analysis device 100 according to the first example will be described with reference to FIG. 21.

Figure 21:
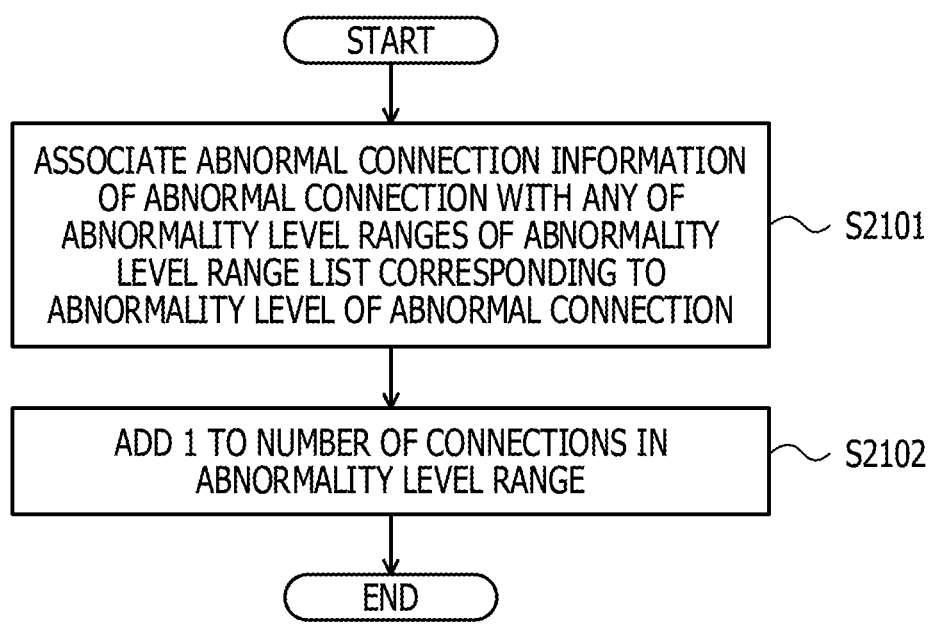
FIG. 21 is a flowchart illustrating an example of a list linkage processing procedure according to the first example.

FIG. 21 is a flowchart illustrating an example of the list linkage processing procedure according to the first example. In FIG. 21, the packet analysis device 100 associates abnormal connection information of the abnormal connection with any of the abnormality level ranges of the abnormality level range list 900 corresponding to the decided abnormality level of the abnormal connection (step S2101).

Next, the packet analysis device 100 adds 1 to the number of connections in the abnormality level range (step S2102). Subsequently, the packet analysis device 100 finishes the list linkage processing.

(Example of Generation Processing Procedure in First Example)

Next, an example of the generation processing procedure executed by the packet analysis device 100 according to the first example will be described with reference to FIG. 22.

Figure 22:
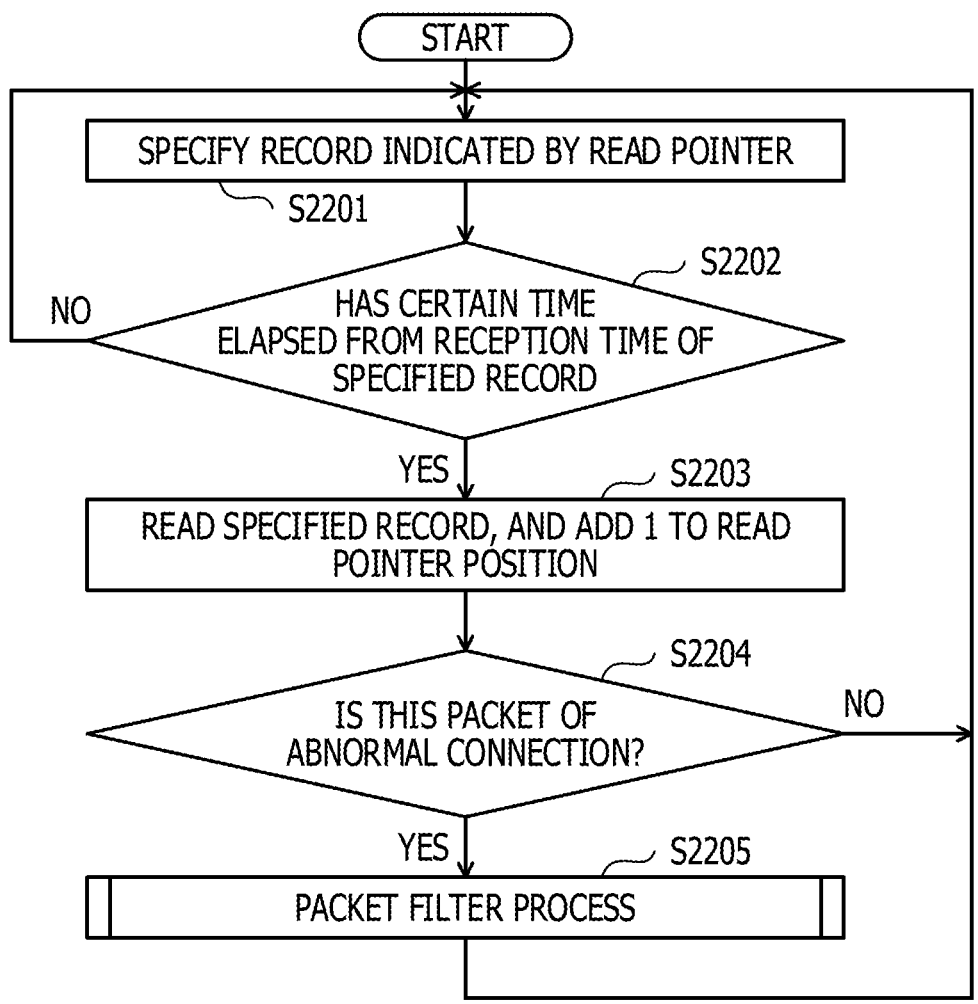
FIG. 22 is a flowchart illustrating an example of a generation processing procedure according to the first example.

FIG. 22 is a flowchart illustrating an example of the generation processing procedure according to the first example. In FIG. 22, the packet analysis device 100 specifies the record of the index table 500 indicated by the read pointer position of the index table 500 (step S2201).

Next, the packet analysis device 100 determines whether a certain time has elapsed from the reception time of the specified record (step S2202). Here, in a case where the certain time has not elapsed (step S2202: No), the packet analysis device 100 returns to the processing of step S2201.

In contrast, in a case where the certain time has elapsed (step S2202: Yes), the packet analysis device 100 reads the specified record and adds 1 to the read pointer position (step S2203). Next, the packet analysis device 100 determines whether the packet indicated by the packet ID of the obtained record is a packet of the abnormal connection associated with the specific abnormality level range of the abnormality level range list 900 (step S2204). Here, in a case where the packet is not a packet of an abnormal connection (step S2204: No), the packet analysis device 100 returns to the processing of step S2201.

In contrast, in a case where the packet is a packet of an abnormal connection (step S2204: Yes), the packet analysis device 100 executes packet filter processing described below with reference to FIG. 23 (step S2205) on the basis of the obtained record. Subsequently, the packet analysis device 100 returns to the processing of step S2201.

(Example of Packet Filter Processing Procedure in First Example)

Next, an example of a packet filtering processing procedure performed by the packet analysis device 100 according to the first example will be described with reference to FIG. 23.

Figure 23:
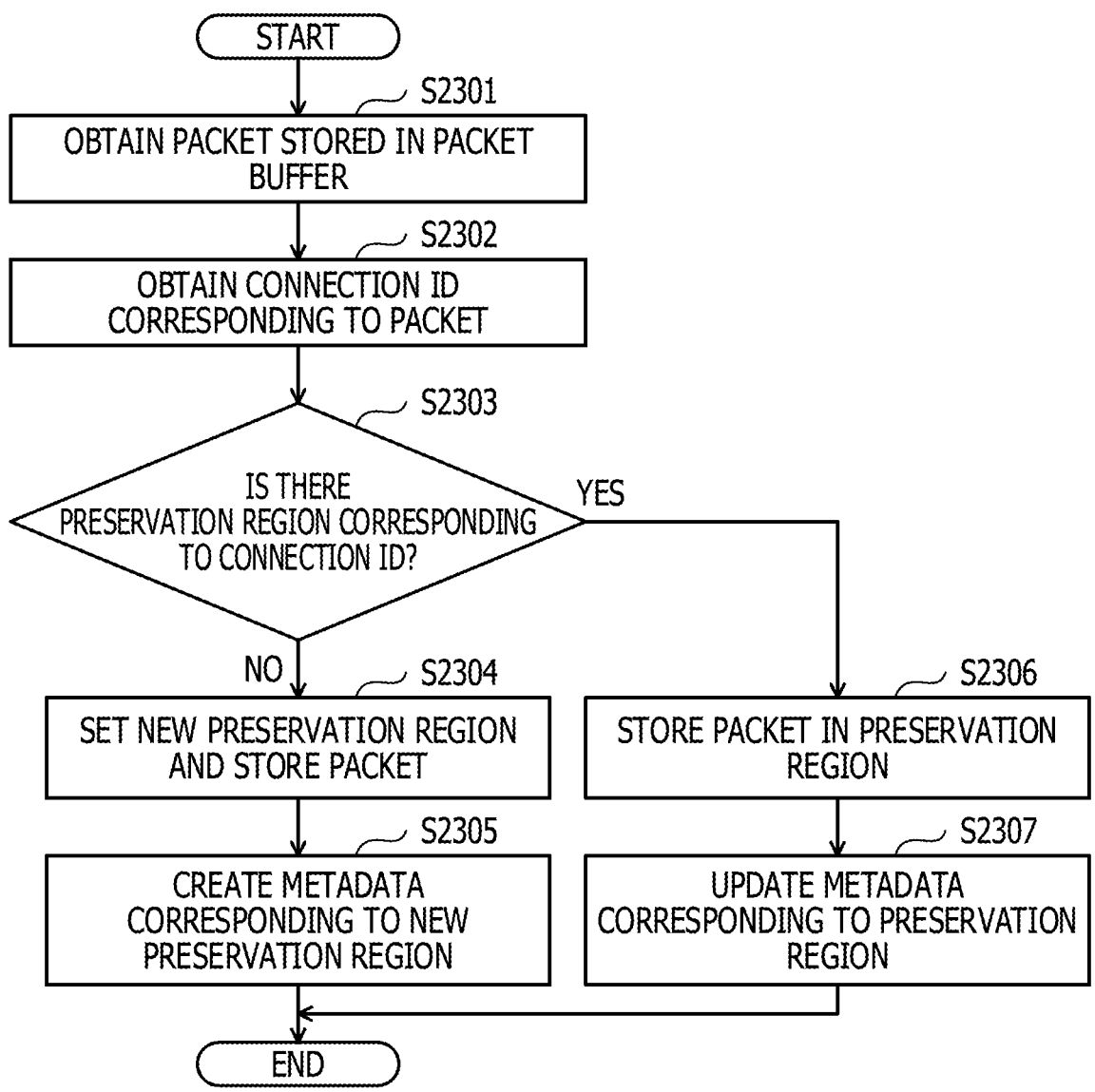
FIG. 23 is a flowchart illustrating an example of a packet filter processing procedure according to the first example.

FIG. 23 is a flowchart illustrating an example of the packet filter processing procedure according to the first example. In FIG. 23, the packet analysis device 100 obtains the packet stored in the packet buffer on the basis of the obtained record (step S2301).

Next, the packet analysis device 100 obtains a connection ID corresponding to the packet (step S2302). Subsequently, the packet analysis device 100 determines whether there is a preservation region corresponding to the connection ID in a storage region such as the memory 302 or the recording medium 305 (step S2303). Here, in a case where there is no preservation region (step S2303: No), the packet analysis device 100 sets a new preservation region and stores the packet (step S2304). Next, the packet analysis device 100 creates metadata corresponding to the new preservation region (step S2305). Subsequently, the packet analysis device 100 finishes the packet filter processing.

In contrast, in a case where there is a preservation region (step S2303: Yes), the packet analysis device 100 stores the packet in the preservation region (step S2306). Next, the packet analysis device 100 updates the metadata corresponding to the preservation region (step S2307). Subsequently, the packet analysis device 100 finishes the packet filter processing.

Second Example

Next, an operation example of the packet analysis device 100 according to the second example will be described with reference to FIG. 24. In the second example, the packet analysis device 100 stores an abnormality level range list 2400 with a list structure different from the abnormality level range list 900 of the first example.

Figure 24:
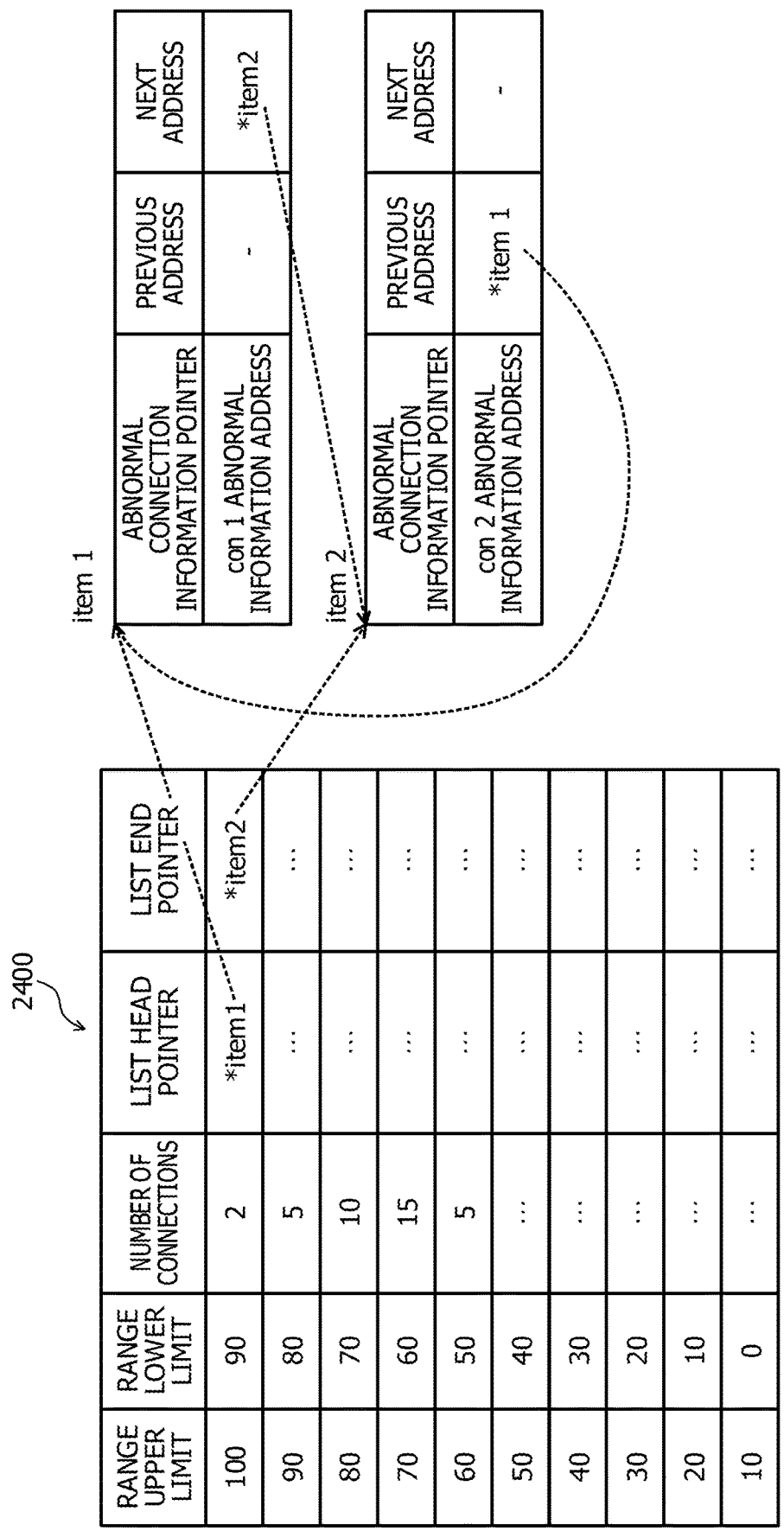
FIG. 24 is an example of content stored in an abnormality level range list 2400 in a second example.

FIG. 24 is an example of content stored in the abnormality level range list 2400 in a second example. As illustrated in FIG. 24, the abnormality level range list 2400 includes fields of Range upper limit, Range lower limit, Number of connections, List head pointer, and List end pointer. Each of the fields is similar to the field in FIG. 9, and thus, description will be omitted. In the example of FIG. 24, items included in the abnormality level range list 2400 are different from those in FIG. 9, and thus, the items will be described below.

An item exists for each of abnormal connections, and has fields of Abnormal connection information pointer, Previous address, and Next address. The field of Abnormal connection information pointer is a setting field for a pointer to abnormal connection information regarding an abnormal connection to be associated with the abnormality level range.

The field of Previous address is a setting field for a pointer to an item including an abnormal connection information pointer for another abnormal connection associated with the same abnormality level range prior to the abnormal connection designated by the abnormal connection information pointer. The field of Next address is a setting field for a pointer to an item including an abnormal connection information pointer for another abnormal connection associated with the same abnormality level range next to the abnormal connection designated by the abnormal connection information pointer.

Here, the plurality of items is to be connected from the head in the order from the latest final preservation time of the corresponding abnormal connection information of each of items. With this configuration, in a case where the final preservation time of certain abnormal connection information has passed, the packet analysis device 100 can collectively delete not only the abnormal connection information but also the abnormal connections associated behind the abnormal connection. This enables the packet analysis device 100 to reduce the processing time taken to delete the abnormal connection information.

(Example of Abnormality Determination Processing Procedure in Second Example)

Next, an example of abnormality determination processing procedure executed by the packet analysis device 100 according to the second example will be described with reference to FIG. 25.

Figure 25:
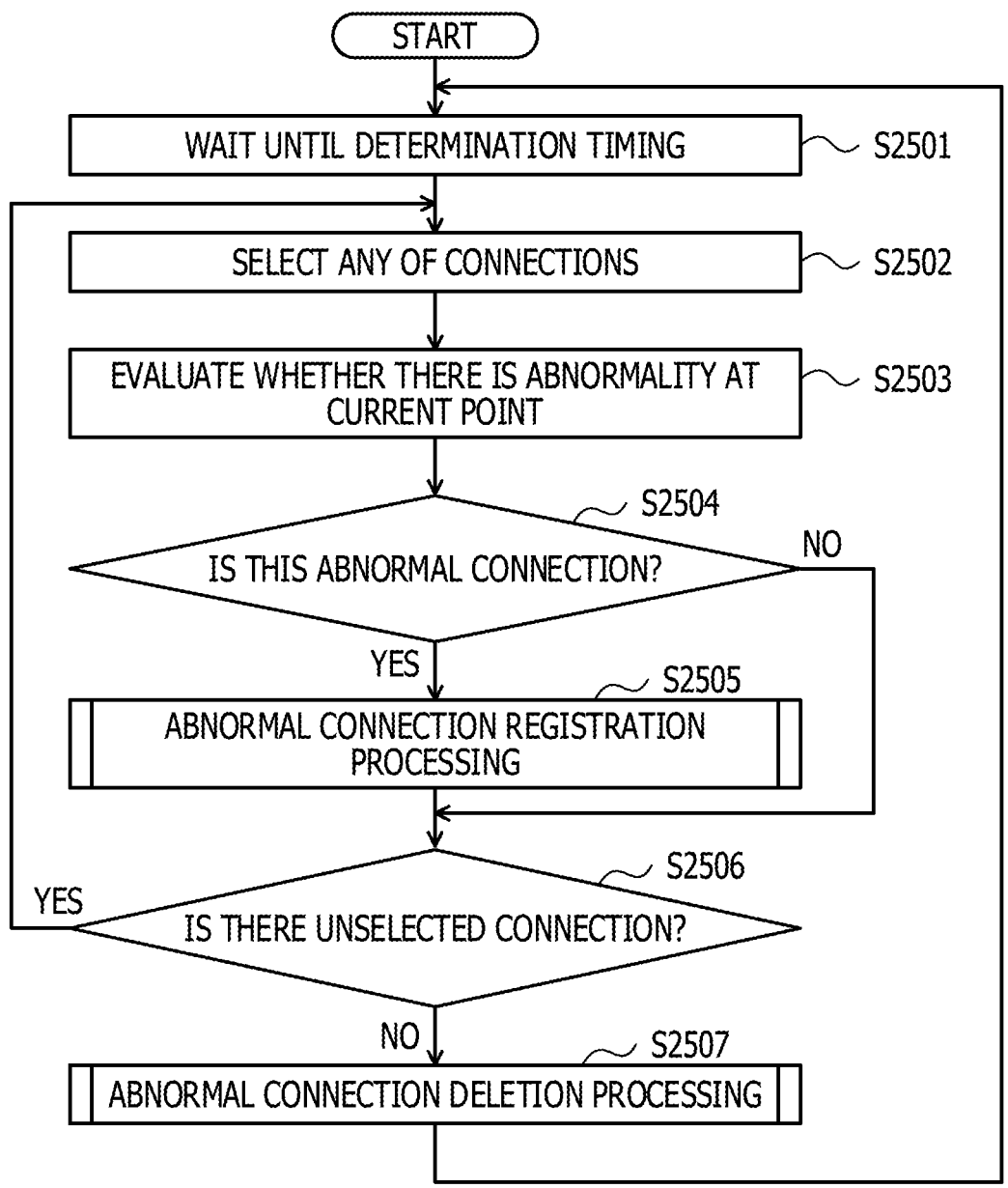
FIG. 25 is a flowchart illustrating an example of an abnormality determination processing procedure according to the second example.

FIG. 25 is a flowchart illustrating an example of the abnormality determination processing procedure according to the second example. In FIG. 25, the packet analysis device 100 waits until determination timings at predetermined time intervals (step S2501). Next, at the determination timing, the packet analysis device 100 refers to the connection table 400 and selects one of the connections (step S2502). Subsequently, the packet analysis device 100 refers to the L4 analysis information table 600, and evaluates whether there is an abnormality in the selected connection at the current point (step S2503).

Thereafter, the packet analysis device 100 refers to the evaluation result and the abnormal connection information table 700, and determines whether the selected connection is an abnormal connection (step S2504). Here, in a case where the connection is not an abnormal connection (step S2504: No), the packet analysis device 100 proceeds to the processing of step S2506.

In contrast, in a case where the connection is an abnormal connection (step S2504: Yes), the packet analysis device 100 executes abnormal connection registration processing described below with reference to FIG. 26 (step S2505). Subsequently, the packet analysis device 100 proceeds to the processing of step S2506.

In step S2506, the packet analysis device 100 refers to the connection table 400 and determines whether there is an unselected connection (step S2506). Here, in a case where there is an unselected connection (step S2506: Yes), the packet analysis device 100 returns to the processing of step S2502.

In contrast, in a case where there is no unselected connection (step S2506: No), the packet analysis device 100 executes abnormal connection deletion processing described below with reference to FIG. 28 (step S2507). Subsequently, the packet analysis device 100 returns to the processing of step S2501.

(Example of Abnormal Connection Registration Processing Procedure in Second Example)

Next, an example of the abnormal connection registration processing procedure executed by the packet analysis device 100 according to the second example will be described with reference to FIG. 26.

Figure 26:
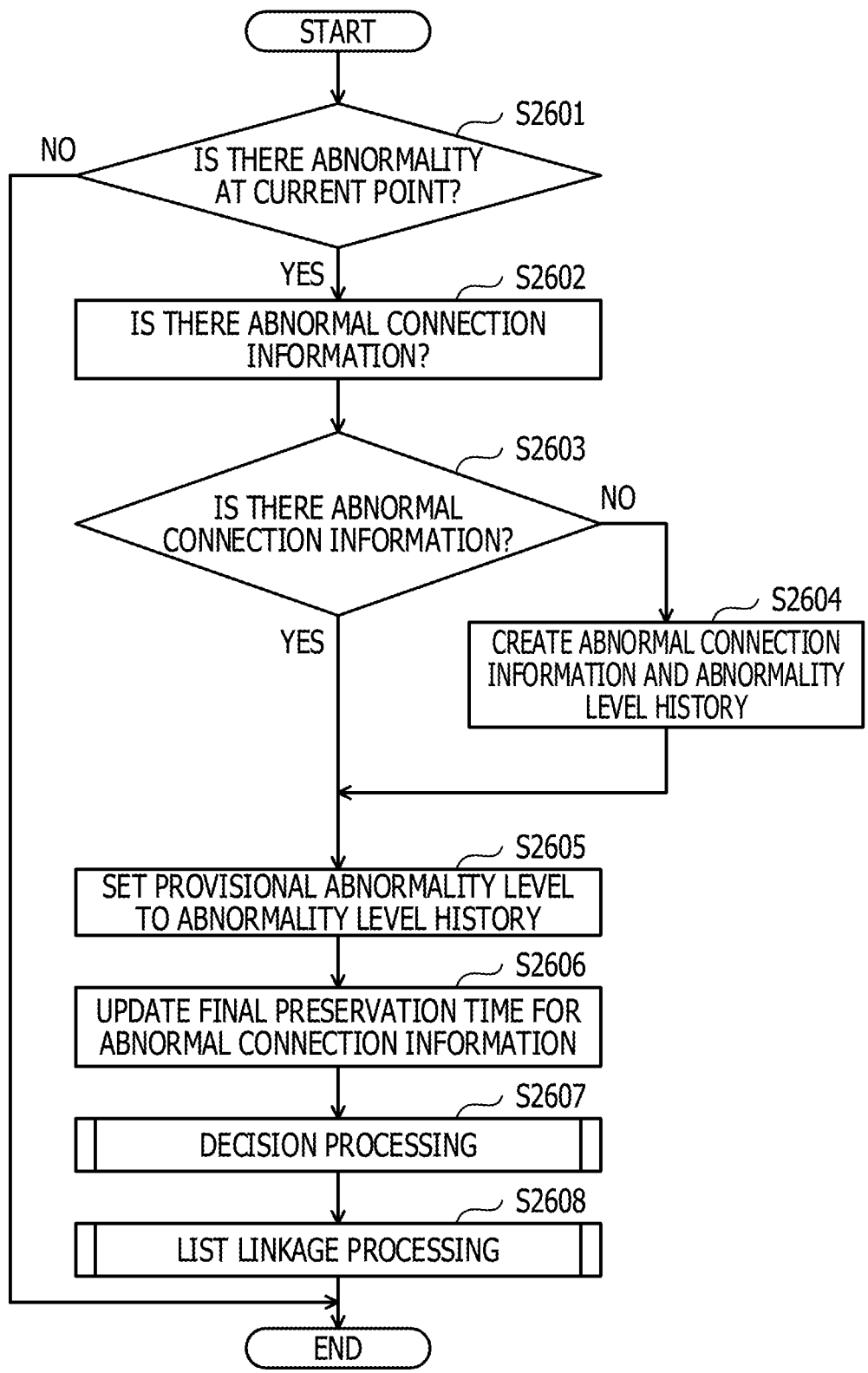
FIG. 26 is a flowchart illustrating an example of an abnormal connection registration processing procedure according to the second example.

FIG. 26 is a flowchart illustrating an example of an abnormal connection registration processing procedure according to the second example. In FIG. 26, the packet analysis device 100 determines whether there is an abnormality in the abnormal connection at the current point (step S2601). Here, in a case where there is an abnormality at the current point (step S2601: Yes), the packet analysis device 100 calculates a provisional abnormality level at the current point of current abnormal connection (step S2602).

Next, the packet analysis device 100 refers to the abnormal connection information table 700 and determines whether there is abnormal connection information for the abnormal connection (step S2603). Here, in a case where there is abnormal connection information (step S2603: Yes), the packet analysis device 100 proceeds to the processing of step S2605.

In contrast, in a case where there is no abnormal connection information (step S2603: No), the packet analysis device 100 creates abnormal connection information and an abnormality level history 800 for the abnormal connection (step S2604). Subsequently, the packet analysis device 100 proceeds to the processing of step S2605.

In step S2605, the packet analysis device 100 sets the calculated provisional abnormality level in the abnormality level history 800 for the abnormal connection (step S2605). Next, the packet analysis device 100 updates the final preservation time of the abnormal connection information for the abnormal connection (step S2606). Subsequently, the packet analysis device 100 executes decision processing described below with reference to FIG. 34 (step S2607).

Next, the packet analysis device 100 executes list linkage processing described below with reference to FIG. 27 (step S2608). Now, the packet analysis device 100 finishes the abnormal connection registration processing.

In contrast, in a case where there is no abnormality at the current point at step S2601 (step S2601: No), the packet analysis device 100 finishes the abnormal connection registration processing.

(Example of List Linkage Processing Procedure in Second Example)

Next, an example of a list linkage processing procedure performed by the packet analysis device 100 according to the second example will be described with reference to FIG. 27.

Figure 27:
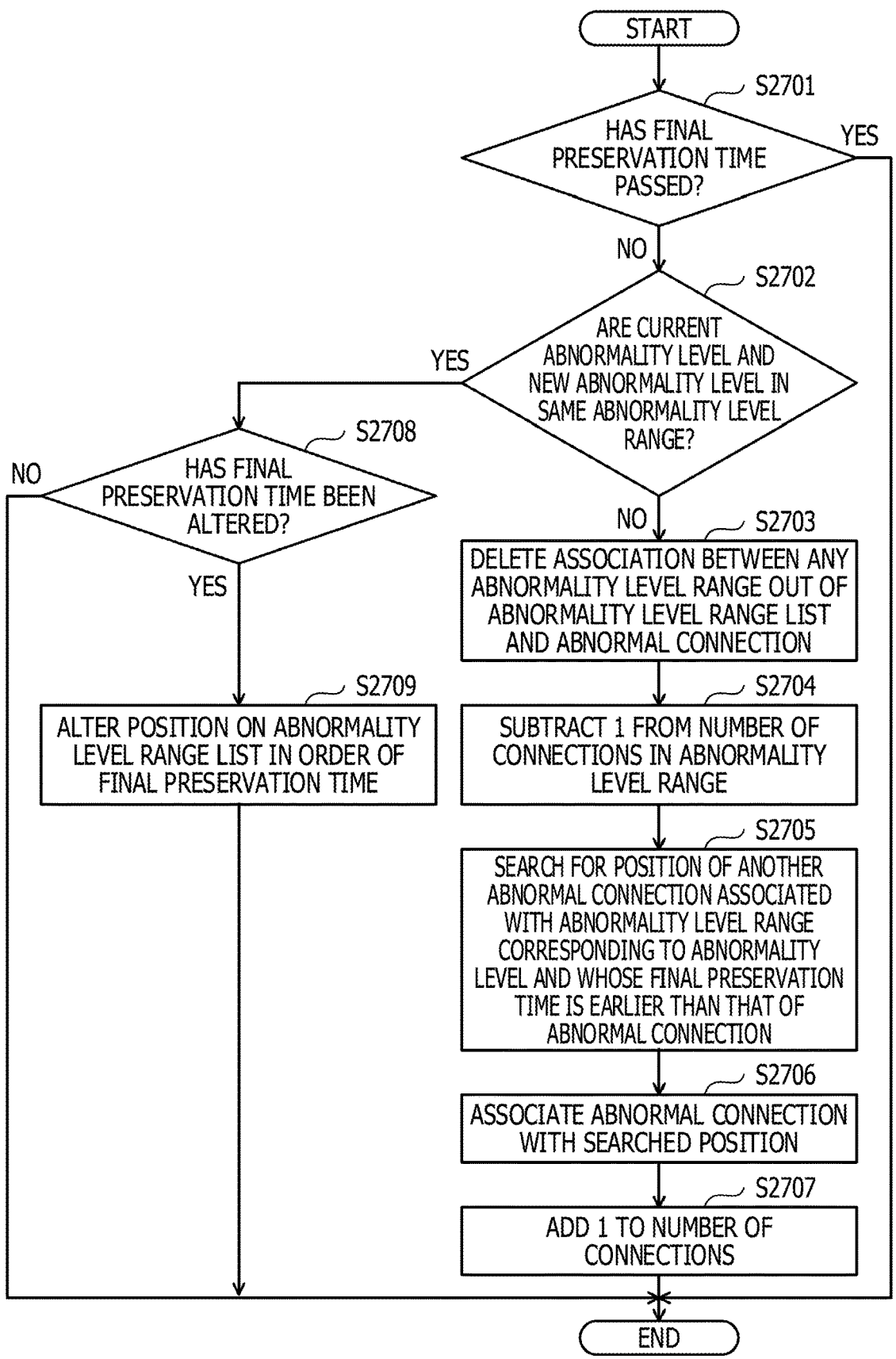
FIG. 27 is a flowchart illustrating an example of a list linkage processing procedure according to the second example.

FIG. 27 is a flowchart illustrating an example of the list linkage processing procedure according to the second example. In FIG. 27, the packet analysis device 100 determines whether the final preservation time has passed (step S2701). Here, in a case where the final preservation time has passed (step S2701: Yes), the packet analysis device 100 finishes the list linkage processing.

In contrast, in a case where the final preservation time has not passed (step S2701: No), the packet analysis device 100 determines whether the current abnormality level of the abnormal connection and the new abnormality level are in a same abnormality level range (step S2702). Here, in a case where the levels are not in a same abnormality level range (step S2702: No), the packet analysis device 100 deletes the association between any of the abnormality level ranges in the abnormality level range list 2400 and the abnormal connection (step S2703).

Next, the packet analysis device 100 subtracts 1 from the number of connections in the abnormality level range (step S2704). Subsequently, the packet analysis device 100 searches for the position of another abnormal connection associated with the abnormality level range corresponding to the decided abnormality level and whose final preservation time is earlier than that of the abnormal connection (step S2705).

Next, the packet analysis device 100 associates an abnormal connection with the searched position (step S2706). Subsequently, the packet analysis device 100 adds 1 to the number of connections (step S2707). Thereafter, the packet analysis device 100 finishes the list linkage processing.

In contrast, in a case where the abnormality levels are in a same abnormality level range (step S2702: Yes), the packet analysis device 100 determines whether the final preservation time has been altered (step S2708). Here, in a case where the final preservation time has not been altered (step S2708: No), the packet analysis device 100 finishes the list linkage processing.

In contrast, in a case where the final preservation time has been altered (step S2708: Yes), the packet analysis device 100 alters the position on the abnormality level range list 2400 in the order of the final preservation time (step S2709). Subsequently, the packet analysis device 100 finishes the list linkage processing.

(Example of Deletion Processing Procedure in Second Example)

Next, an example of a deletion processing procedure executed by the packet analysis device 100 according to the second example will be described with reference to FIG. 28.

Figure 28:
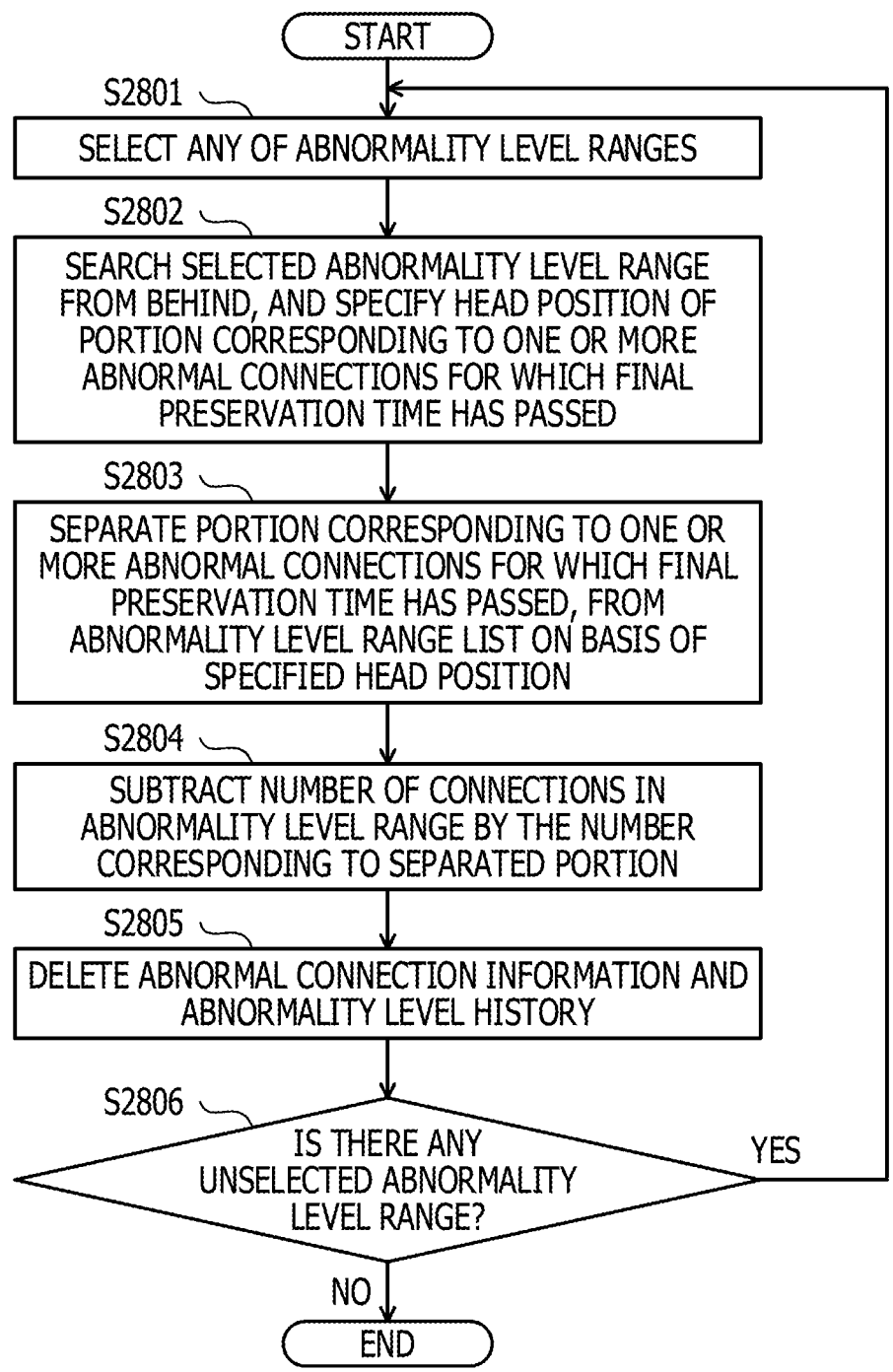
FIG. 28 is a flowchart illustrating an example of a deletion processing procedure according to the second example.

FIG. 28 is a flowchart illustrating an example of the deletion processing procedure according to the second example. In FIG. 28, the packet analysis device 100 selects one of the abnormality level ranges (step S2801). Next, the packet analysis device 100 searches the selected abnormality level range from behind, and specifies a head position of a portion corresponding to one or more abnormal connections for which the final preservation time has passed (step S2802). Subsequently, the packet analysis device 100 separates a portion corresponding to the one or more abnormal connections for which the final preservation time has passed, from the abnormality level range list 2400 on the basis of the specified head position (step S2803).

Next, the packet analysis device 100 subtracts the number of connections in the abnormality level range by the number corresponding to the separated portion (step S2804). Subsequently, the packet analysis device 100 deletes the abnormal connection information and the abnormality level history 800 (step S2805). Next, the packet analysis device 100 determines whether there is an unselected abnormality level range (step S2806). Here, in a case where there is an unselected abnormality level range (step S2806: Yes), the packet analysis device 100 returns to the processing of step S2801.

In contrast, in a case where there is no unselected abnormality level range (step S2806: No), the packet analysis device 100 finishes the deletion processing.

As described above, with the use of the packet analysis device 100, it is possible to accumulate obtained packets. In addition, according to the packet analysis device 100, the packet analysis device 100 can accumulate, on the basis of an obtained packet, information regarding communication performance of the connection used to transfer the packet in association with the information indicating the connection used to transfer the packet. In addition, according to the packet analysis device 100, it is possible to register information indicating a connection in association with any of a plurality of abnormality level ranges including the abnormality level indicating the communication performance of the connection at predetermined time intervals. In addition, according to the packet analysis device 100, out of the accumulated packets for which a certain time has elapsed from the acquisition, the packets transferred through the connection corresponding to the specific abnormality level range can be extracted and stored in the preservation file. With this configuration, the packet analysis device 100 can analyze, post-actively in detail, various connections between certain devices, a network that connects certain devices, or the like, on the basis of the packets extracted and stored. Moreover, the packet analysis device 100 does not have to perform sorting based on the abnormality level, and can selectively store packets with relatively low processing load.

Furthermore, according to the packet analysis device 100, in a case where the abnormality level indicating the communication performance of the first connection is a threshold or more, it is possible to register the information indicating the first connection in association with the abnormality level range including the abnormality level. As a result, the packet analysis device 100 can easily extract packets transferred through an abnormal connection, which has a relatively high abnormality level and a relatively high possibility of performing a post-active and detailed analysis. In addition, this configuration enables the packet analysis device 100 to suppress extraction of a packet transferred through an abnormal connection, which has a relatively low abnormality level and a relatively low possibility of performing a post-active and detailed analysis so as to suppress occurrence of shortage of storage region.

Furthermore, according to the packet analysis device 100, in a case where the information indicating the first connection is registered in association with the abnormality level range, the expiration of the registration state of the information indicating the first connection to the abnormality level range can be set to a time after a certain time from the current time. In addition, the packet analysis device 100 can suppress, until the expiration, the information indicating the first connection from being associated with the abnormality level range indicating that the communication performance is lower than the currently associated abnormality level range. With this configuration, the registration part 1004 can suppress, until the expiration, a failure in storing in a preservation file, of a packet having a temporarily high abnormality level and that is to be preferably stored in the preservation file, along a subsequent decrease in the abnormality level.

Furthermore, according to the packet analysis device 100, in a case where the abnormality level indicating the communication performance of the first connection is increased, it is possible to re-register the information indicating the first connection in association with the abnormality level range including the abnormality level indicating the communication performance of the first connection. Furthermore, according to the packet analysis device 100, the expiration can be re-set to a time after a certain time from the current time. This makes it easy for the packet analysis device 100 to preferentially store, in the preservation file, the packet that has an increased abnormality level and that is to be preferably stored in the preservation file. Furthermore, the packet analysis device 100 can facilitate storage of the packet in the preservation file for a certain time after occurrence of the increase in the abnormality level.

Furthermore, in a case where the abnormality level indicating the communication performance of the first connection is lowered, the packet analysis device 100 is capable of suppressing alteration of the registration state of the information indicating the first connection to the abnormality level range. This would make it possible to suppress, by the packet analysis device 100, a situation in which the packet transferred through the first connection remains unextracted immediately after the abnormality level is lowered.

Furthermore, in a case where the abnormality level indicating the communication performance of the first connection decreases and remains to be included in the currently associated abnormality level range, the packet analysis device 100 can re-set the expiration to a time after a certain time from the current time. With this configuration, the packet analysis device 100 can extract a packet for a longer period and store it in the preservation file in a case where the abnormality continues in the abnormal connection.

Moreover, when the expiration is passed, the packet analysis device 100 can re-register the information indicating the first connection in association with the abnormality level range on the basis of any of the abnormality levels indicating the communication performance of the first connection within a predetermined period. Furthermore, the packet analysis device 100 can re-set the expiration to a time after a certain time from the current time. With this configuration, the packet analysis device 100 can improve the possibility of being able to use the abnormality level which is to be preferably used in registration of abnormal connection information, as compared with the case of using an abnormality level at the current time alone. This would make it easy for the packet analysis device 100 to further effectively extract packets transferred through the abnormal connection, which is to be preferably stored in the preservation file.

Furthermore, the packet analysis device 100 can set a retention time limit of the registration state of the information indicating the first connection to any of the abnormality level ranges on the basis of the abnormality level indicating the communication performance of the first connection. Moreover, according to the packet analysis device 100, it is possible to delete the registration state of the information indicating the first connection to the third storage 130 in a case where the retention time limit has passed. This enables the packet analysis device 100 to suppress storage of the packet that has passed the retention time limit and having lowered possibility of being used at a post-active and detailed analysis of connection and preferably being not stored in the preservation file, in the preservation file.

The packet analysis method described in the present embodiment can be implemented by executing a prepared program on a computer such as a personal computer or a workstation. The packet analysis program described in the present embodiment is recorded on a computer-readable recording medium such as a hard disk, flexible disk, CD-ROM, MO, or DVD, and is read from the recording medium to be executed by the computer. Moreover, the packet analysis program described in the present embodiment may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a packet analysis program for causing a computer to execute processing comprising:
    accumulating a packet in a first memory;
    accumulating, in a second memory, first information regarding communication performance, which includes an index value of a packet loss rate, a round-trip time (RTT) or a server delay, of a connection which is used to transfer the packet in association with second information indicating the connection based on the packet;
    preparing a plurality of ranges of the index value;
    selecting, for each of connections, one index value range, from among the plurality of index value ranges, which includes the index value of each of connections, at time intervals with reference to the second memory;
    registering the second information in a third memory in association with the selected index value range;
    selecting, with reference to the third memory, one or more index value ranges in which a total number of connections in descending order of the index value is equal to or less than a specific value out of connections corresponding to packets that are accumulated in the first memory and for which a first time is elapsed from acquisition of the packets;
    extracting one or more packets corresponding to the one or more index value ranges; and
    storing the extracted one or more packets in a fourth memory.

2. The non-transitory computer-readable recording medium according to claim 1, wherein the processing further comprising:
    in a case where the index value indicating communication performance of a first connection is an index value indicating predetermined communication performance or below, registering the second information indicating the first connection in the third memory in association with one of the plurality of index value ranges.

3. The non-transitory computer-readable recording medium according to claim 2, wherein the processing further comprising:
    in a case where the second information indicating the first connection is registered in the third memory, setting an expiration of a registration state of the second information indicating the first connection in the third memory to a time after a second time from a current time; and
    in a case where the second information indicating the first connection is to be re-registered in the third memory, associating, until the expiration, the second information indicating the first connection with an index value range corresponding to the first connection, or with an index value range indicating lower communication performance than the index value range corresponding to the first connection.

4. The non-transitory computer-readable recording medium according to claim 3, wherein the processing further comprising:
   in a case where a change in the index value indicating the communication performance of the first connection indicates reduction in the communication performance of the first connection, re-registering the second information indicating the first connection in the third memory in association with the index value range corresponding to the first connection; and
   re-setting the expiration to a time after the second time from the current time.

5. The non-transitory computer-readable recording medium according to claim 3, wherein the processing further comprising:
   in a case where the change in the index value corresponding to the first connection indicates improvement of the communication performance of the first connection, maintaining the registration state of the second information indicating the first connection to the third memory.

6. The non-transitory computer-readable recording medium according to claim 3, wherein the processing further comprising:
   in a case where the change in the index value corresponding to the first connection indicates improvement of the communication performance of the first connection and the index value corresponding to the first connection is included in the index value range corresponding to the first connection, re-setting the expiration to a time after the second time from the current time.

7. The non-transitory computer-readable recording medium according to claim 3, wherein the processing further comprising:
   in a case where the expiration has passed, re-registering the second information indicating the first connection in the third memory in association with an index value ranges including one index value among index values indicating communication performance of the first connection within a predetermined period; and
   re-setting the expiration to a time after the second time from the current time.

8. The non-transitory computer-readable recording medium according to claim 2, wherein the processing further comprising:
   in a case where the index value of the first connection is an index value indicating that the communication performance is predetermined communication performance or below, setting a retention time limit concerning the registration state of the second information indicating the first connection to the third memory to a time after a second time from the current time; and
   deleting the registration state of the second information indicating the first connection to the third memory in a case where the retention time limit elapses.

9. A packet analysis method for causing a computer to execute processing comprising:
   accumulating a packet in a first memory;
   accumulating, in a second memory, first information regarding communication performance, which includes an index value of a packet loss rate, a round-trip time (RTT) or a server delay, of a connection which is used to transfer the packet in association with second information indicating the connection based on the packet;
   preparing a plurality of ranges of the index value;
   selecting, for each of connections, one index value range, from among the plurality of index value ranges, which includes the index value of each of connections, at time intervals with reference to the second memory;
   registering the second information in a third memory in association with the selected index value range;
   selecting, with reference to the third memory, one or more index value ranges in which a total number of connections in descending order of the index value is equal to or less than a specific value out of connections corresponding to packets that are accumulated in the first memory and for which a first time is elapsed from acquisition of the packets;
   extracting one or more packets corresponding to the one or more index value ranges; and
   storing the extracted one or more packets in a fourth memory.

10. An information processing device comprising:
    a memory: and
    a processor coupled to the memory and configured to:
       accumulate a packet in a first memory;
       accumulate, in a second memory, first information regarding communication performance, which includes an index value of a packet loss rate, a round-trip time (RTT) or a server delay, of a connection which is used to transfer the packet in association with second information indicating the connection based on the packet;
       prepare a plurality of ranges of the index value;
       select, for each of connections, one index value range, from among the plurality of index value ranges, which includes the index value of each of connections, at time intervals with reference to the second memory;
       register the second information in a third memory in association with the selected index value range;
       select, with reference to the third memory, one or more index value ranges in which a total number of connections in descending order of the index value is equal to or less than a specific value out of connections corresponding to packets that are accumulated in the first memory and for which a first time is elapsed from acquisition of the packets;
       extract one or more packets corresponding to the one or more index value ranges; and
       store the extracted one or more packets in a fourth memory.

* * * * *